Figure 1:
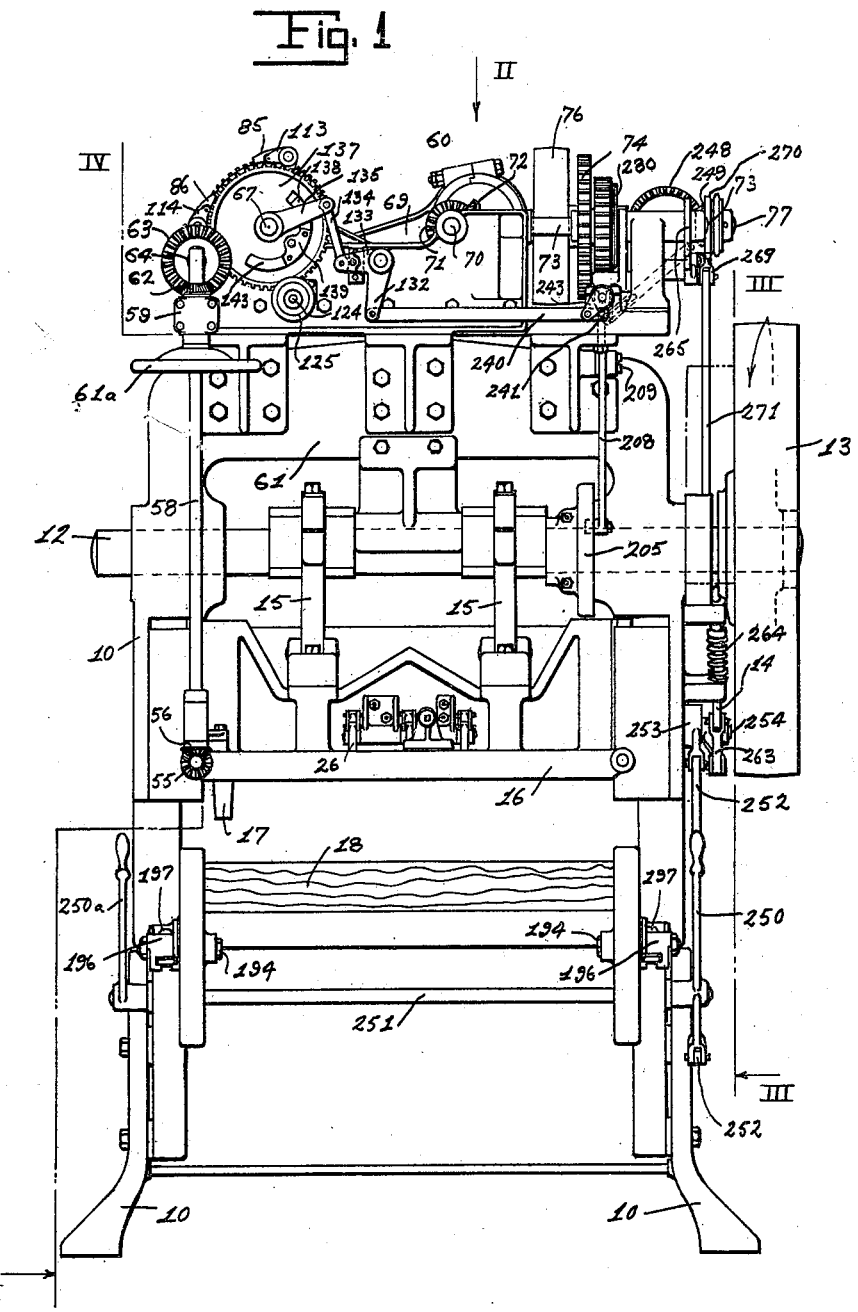

B. W. TUCKER.
AUTOMATIC DIE PRESS.
APPLICATION FILED FEB. 27, 1909.

980,028.

Patented Dec. 27, 1910.
14 SHEETS—SHEET 1.

Witnesses:
G. V. James
L. R. Compton

Inventor
Benjamin W. Tucker
By his Attorneys
Criswell & Criswell

B. W. TUCKER.
AUTOMATIC DIE PRESS.
APPLICATION FILED FEB. 27, 1909.

980,028.

Patented Dec. 27, 1910.
14 SHEETS—SHEET 4.

Witnesses:
G. V. James.
L. R. Compton

Inventor
Benjamin W. Tucker
By his Attorneys
Criswell & Criswell

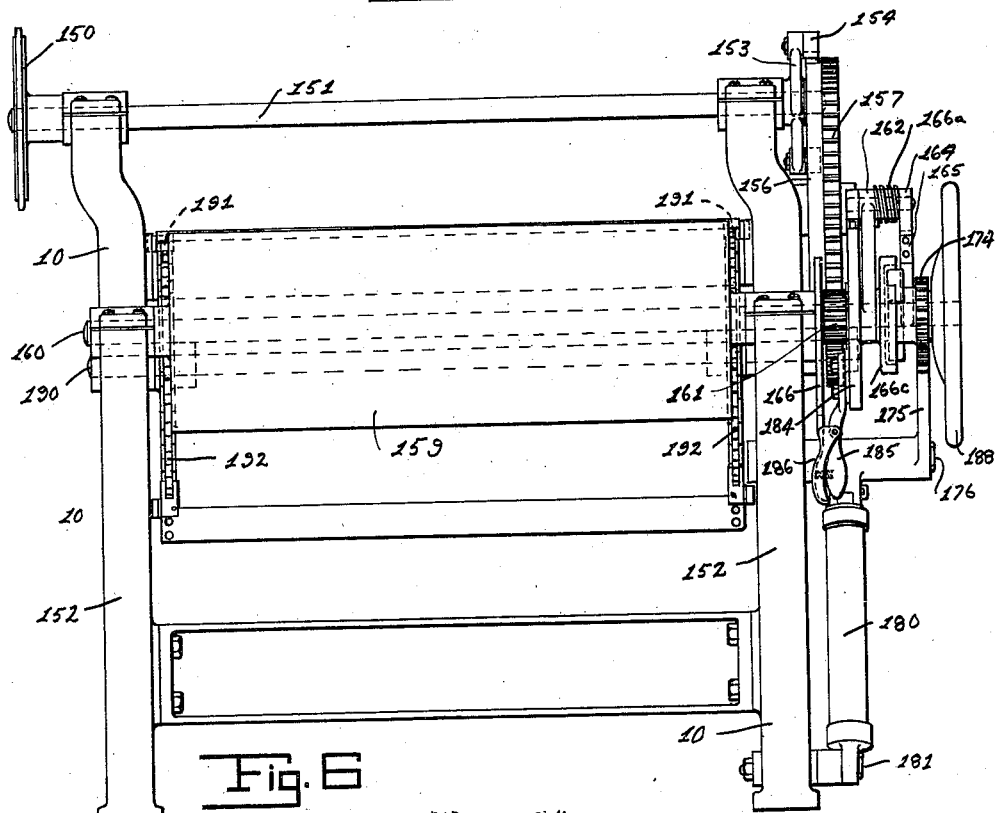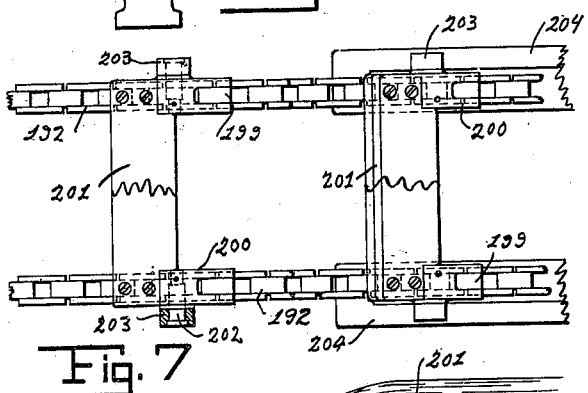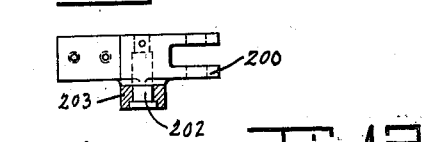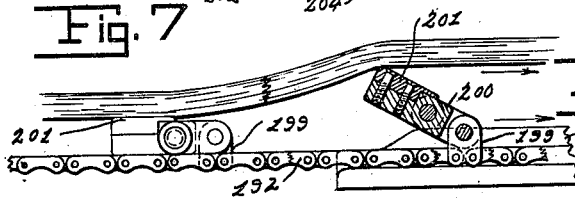

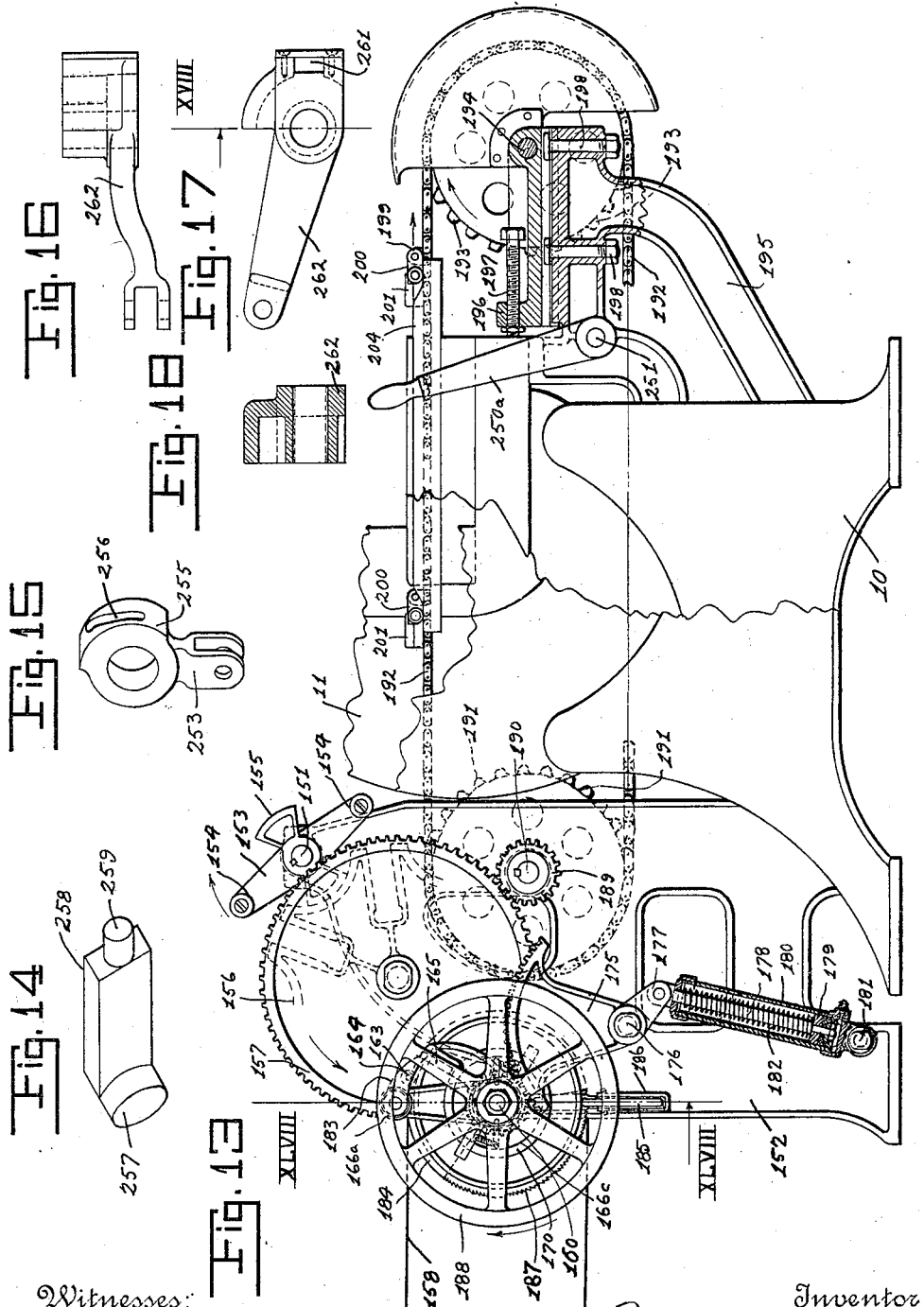

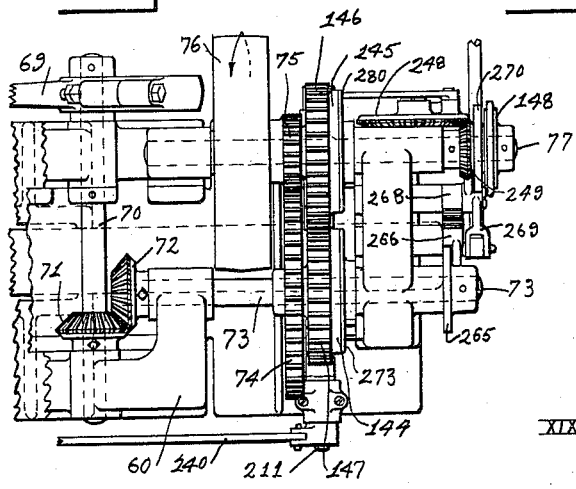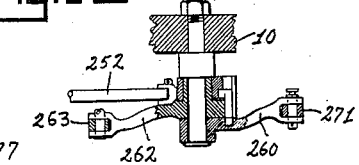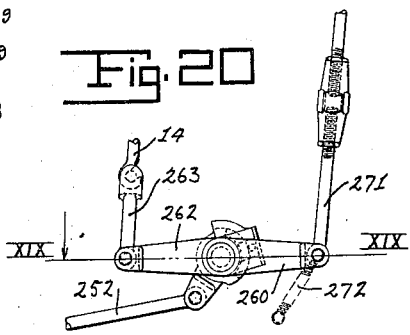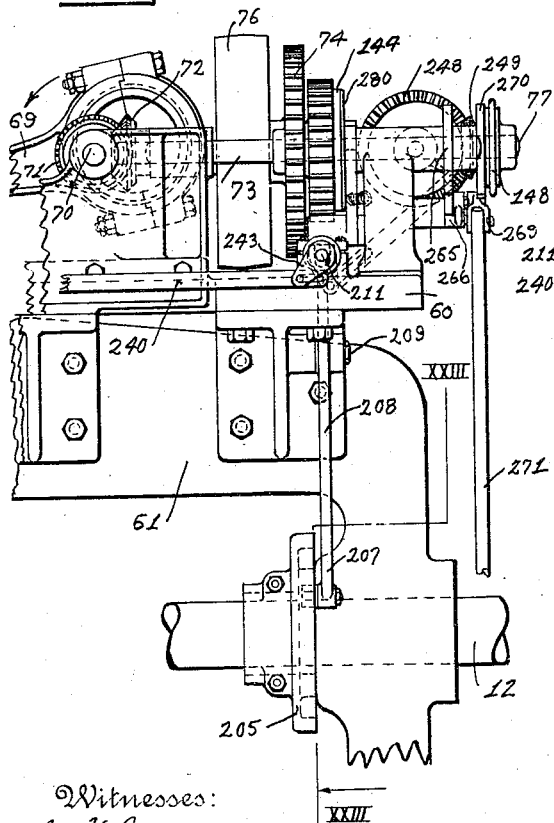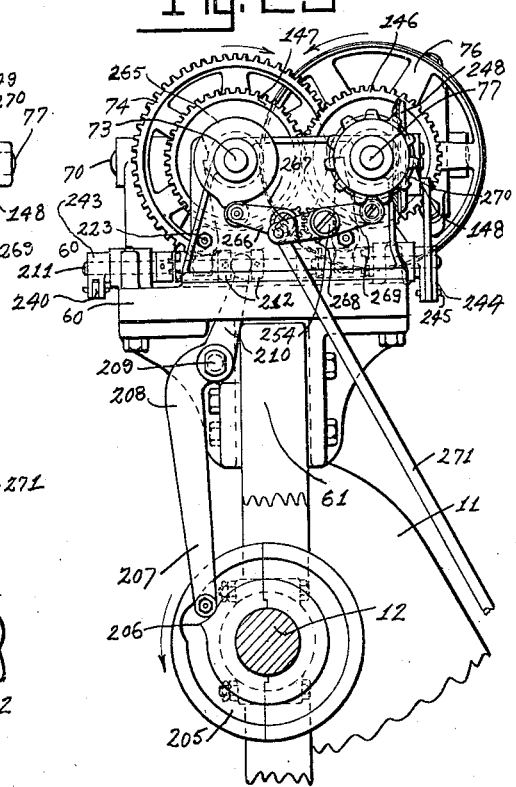

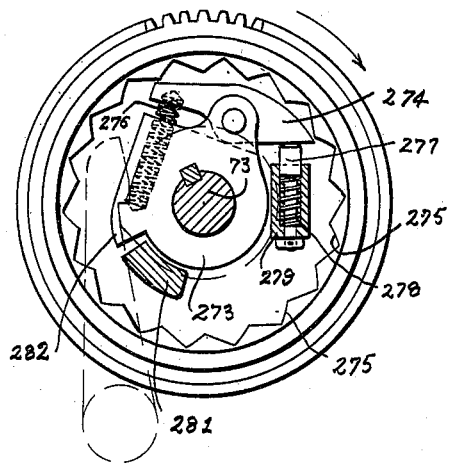
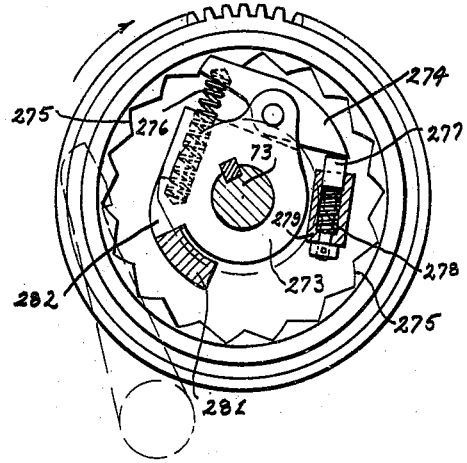
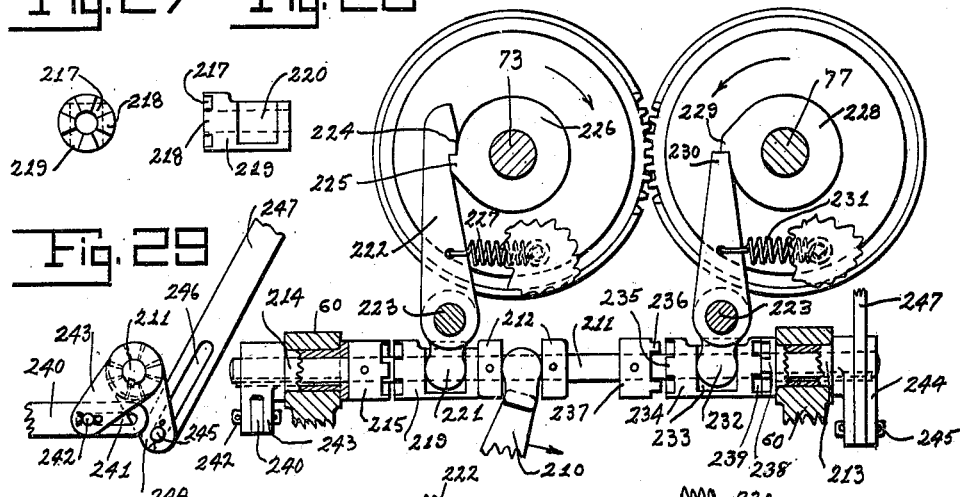
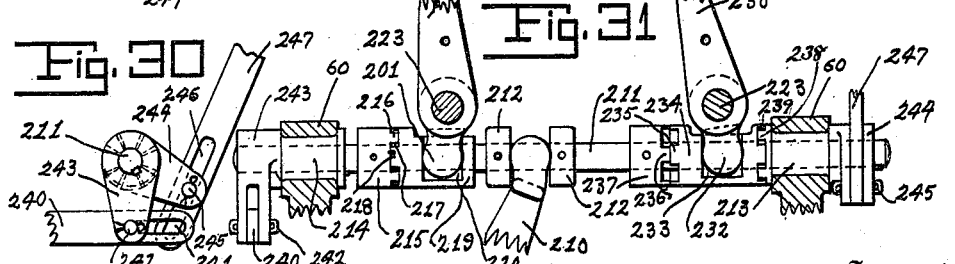

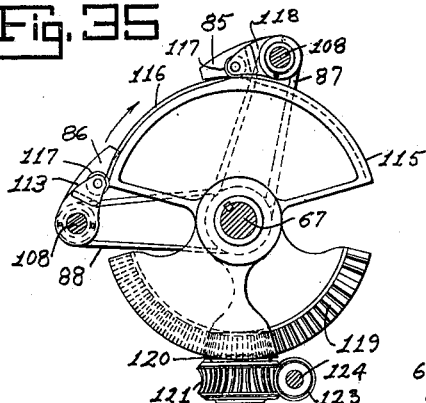
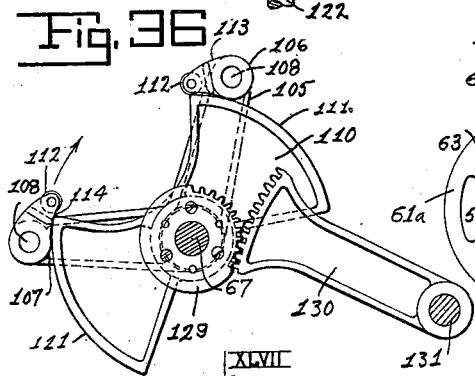
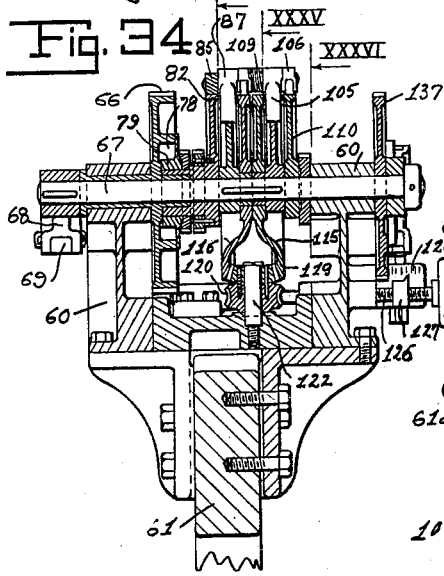
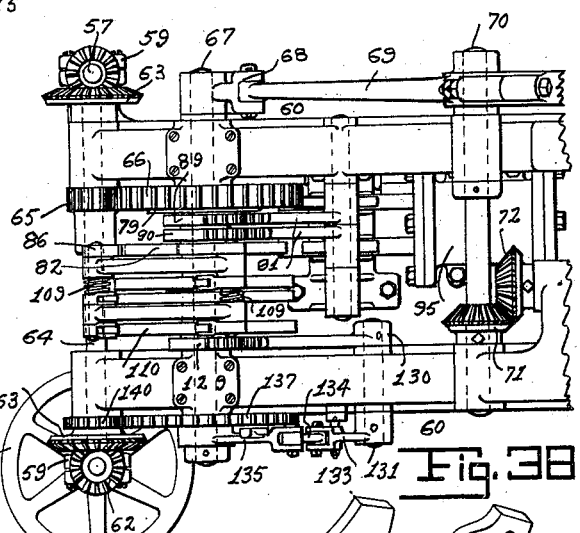
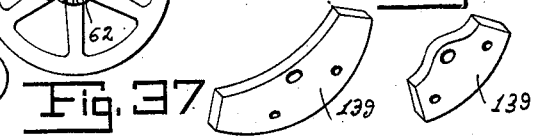
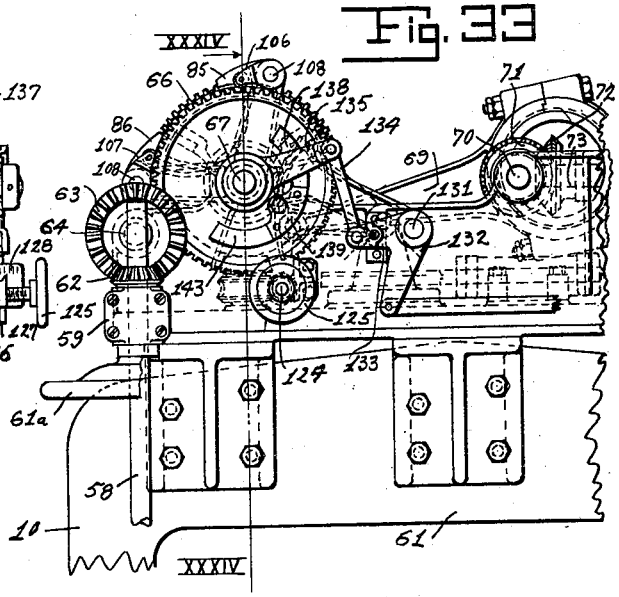

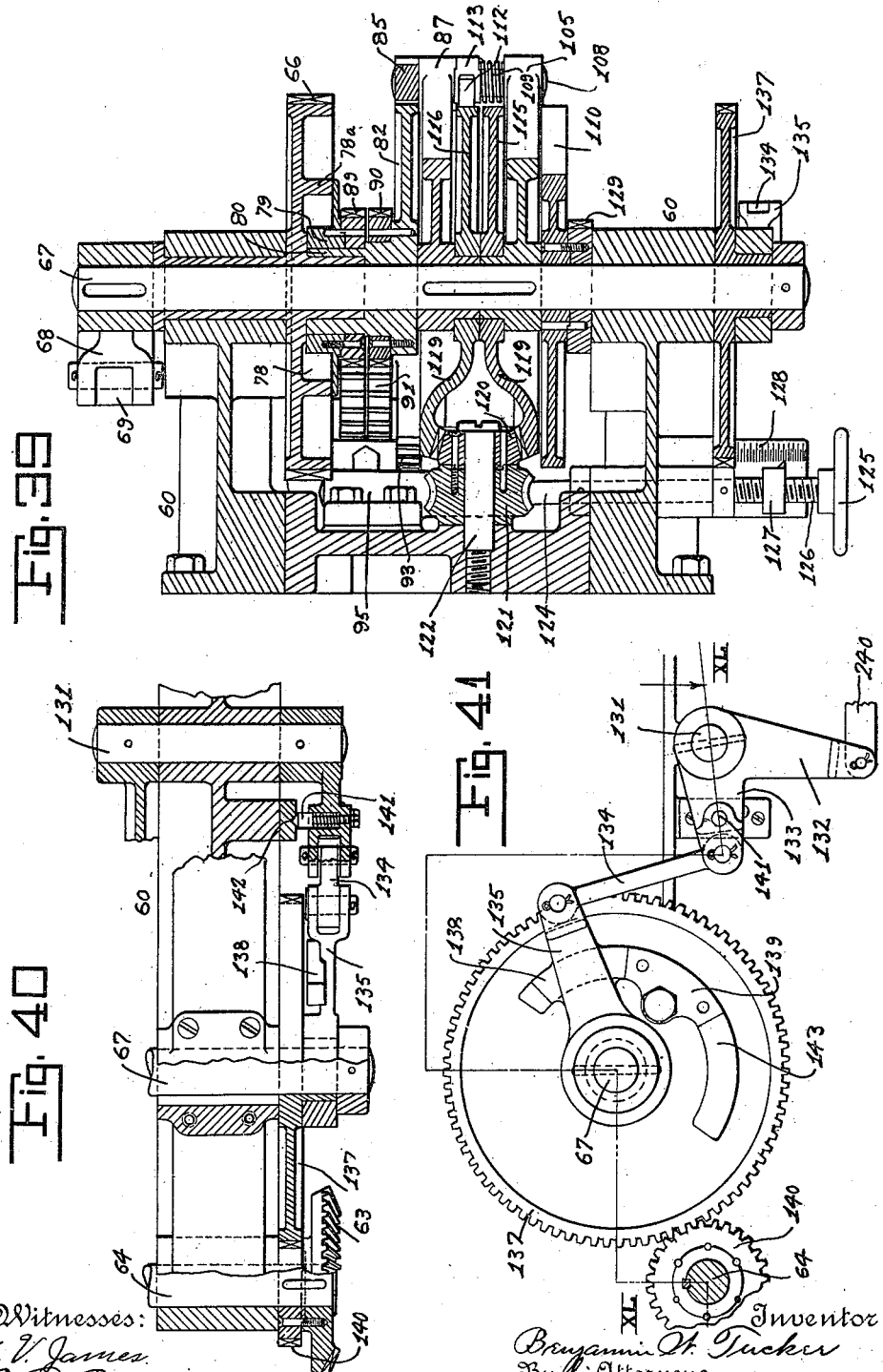

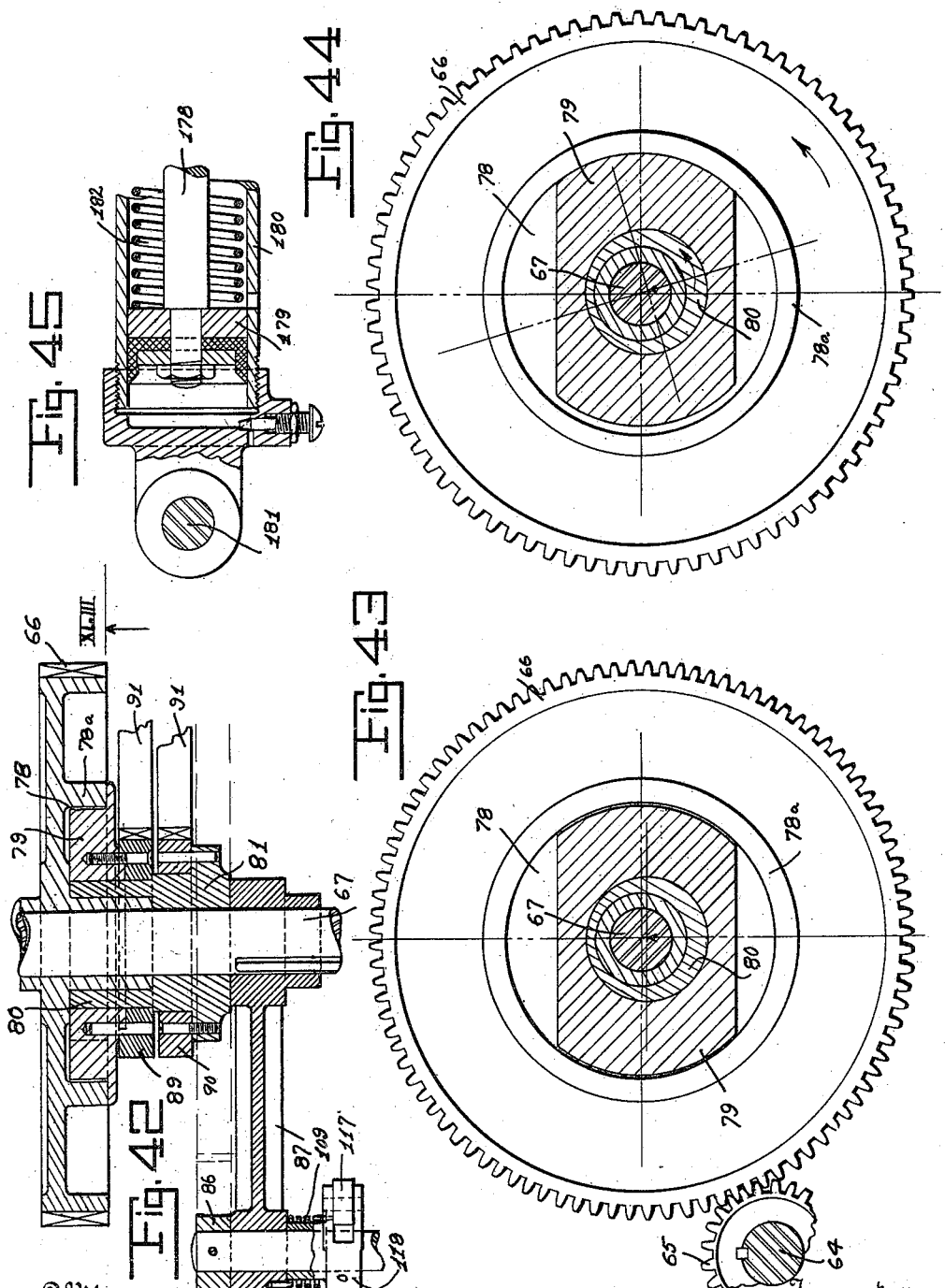

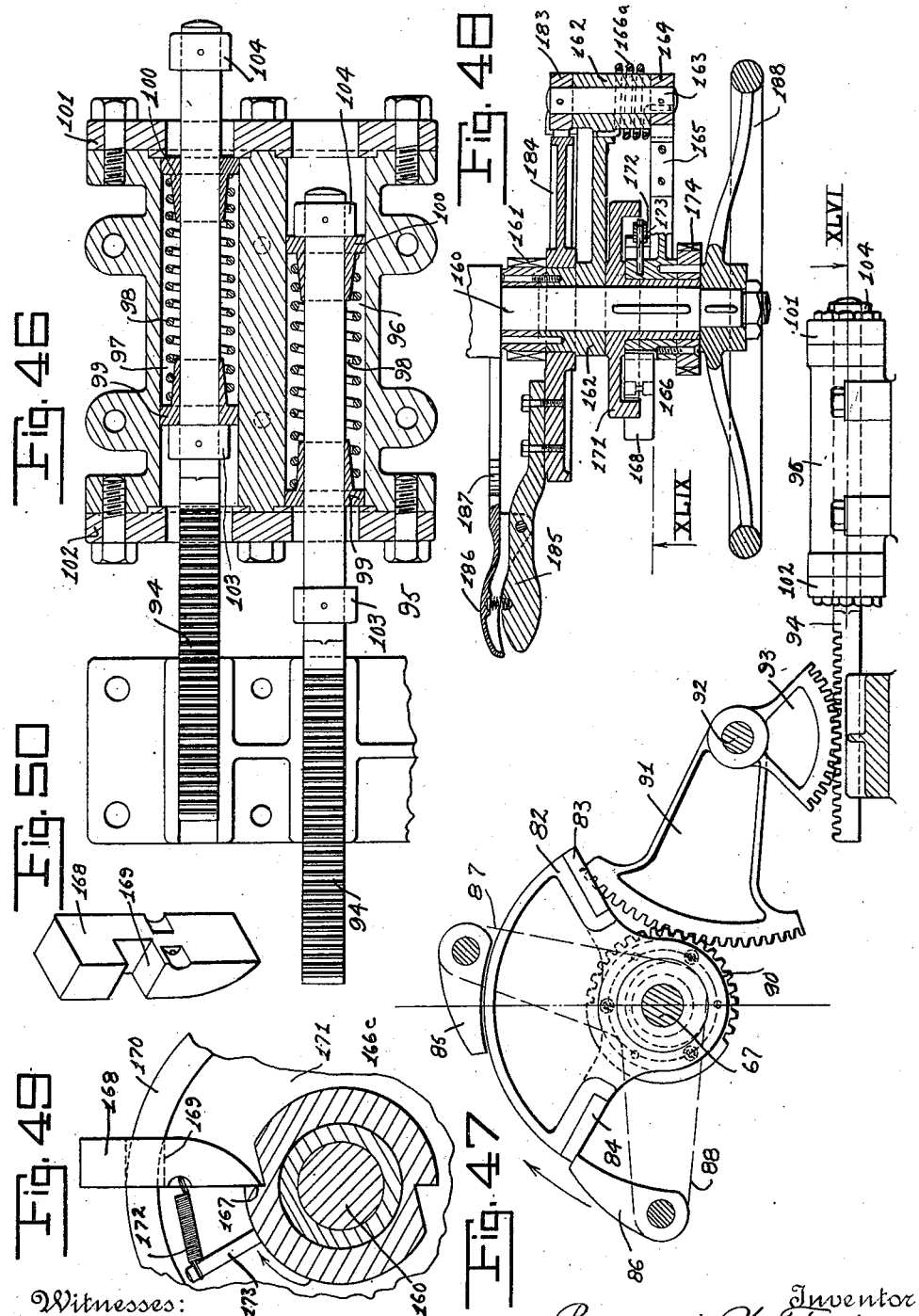

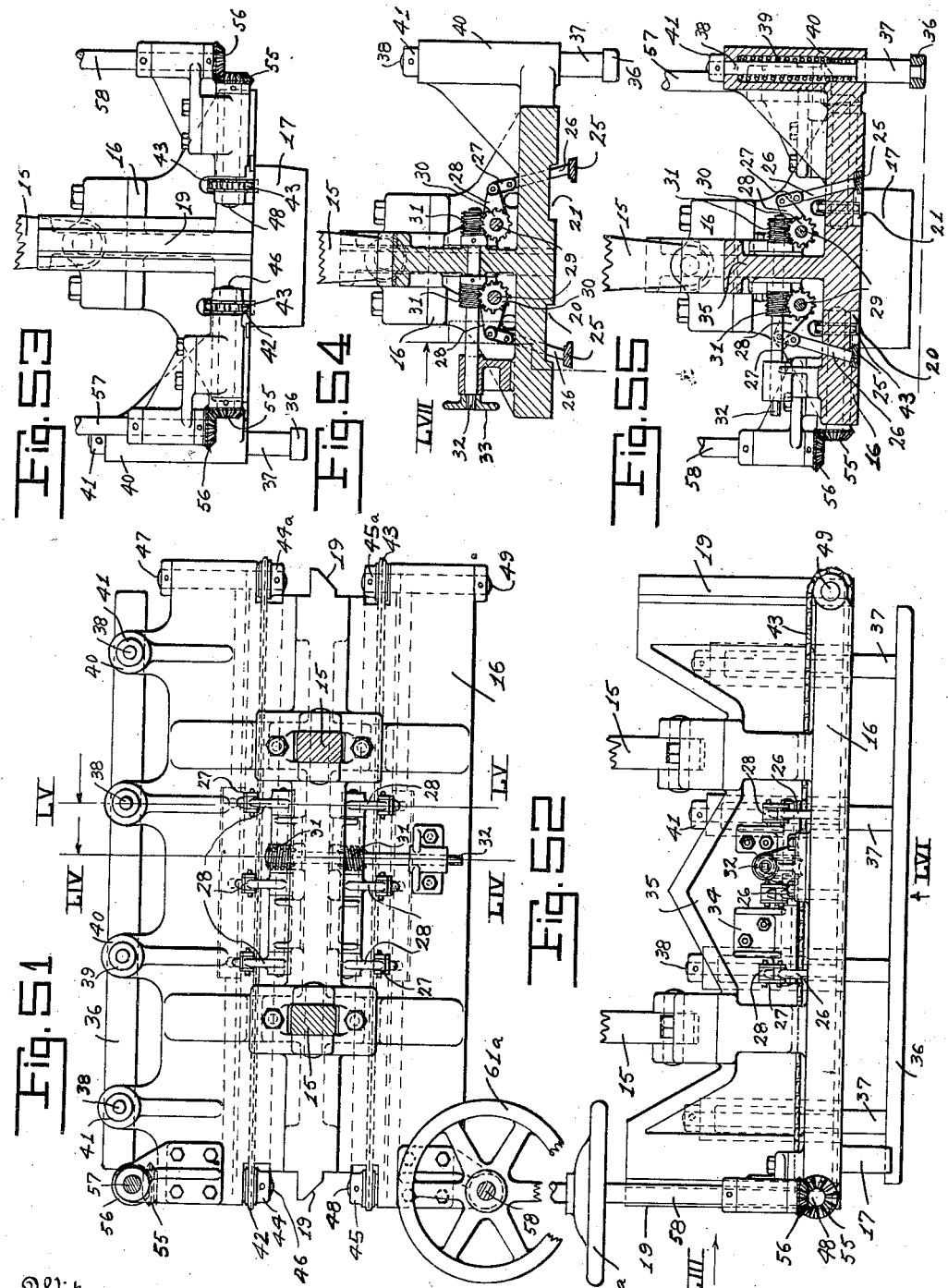

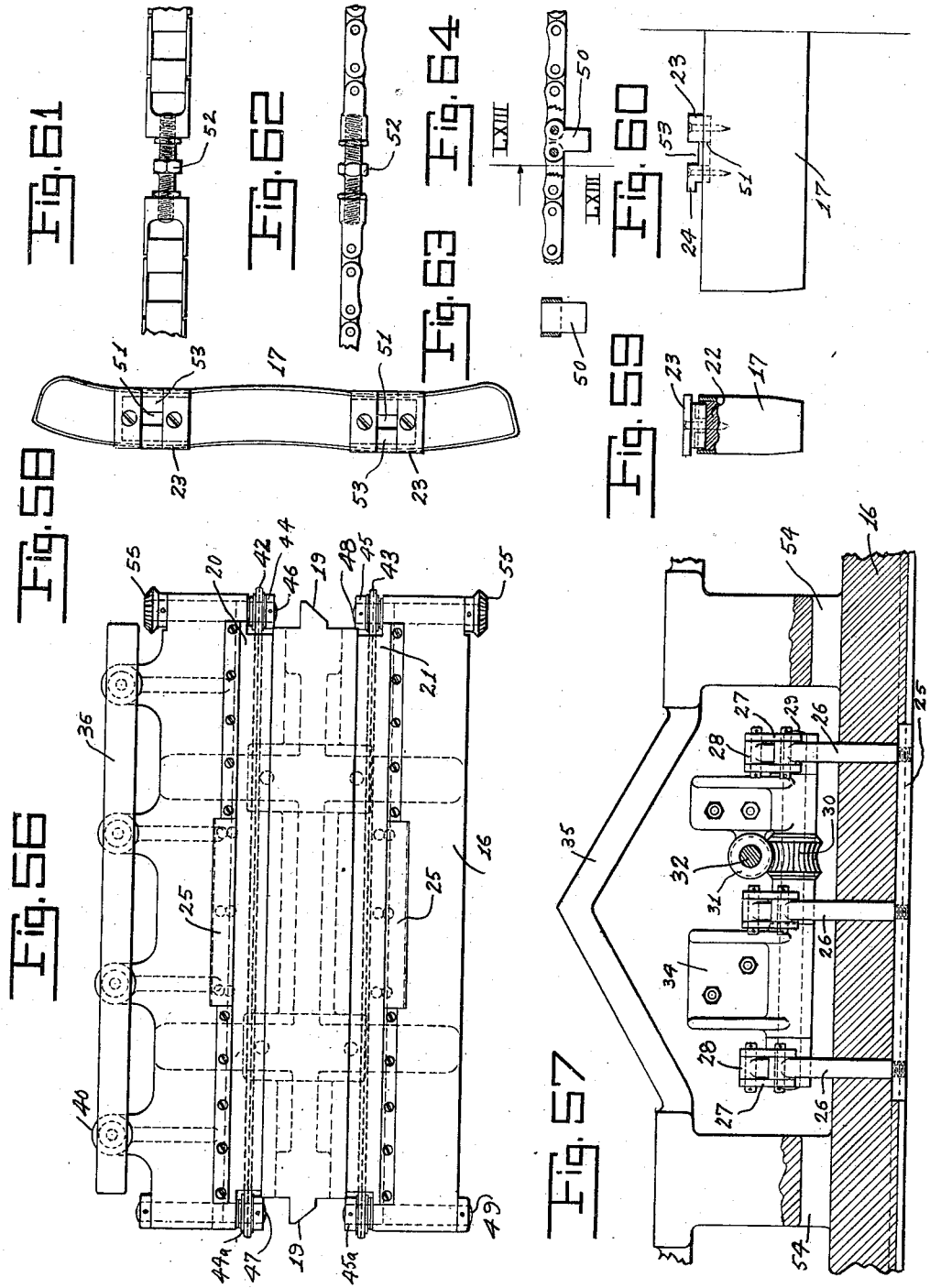

UNITED STATES PATENT OFFICE.

BENJAMIN W. TUCKER, OF SOUTH ORANGE, NEW JERSEY.

AUTOMATIC DIE-PRESS.

980,028.                        Specification of Letters Patent.        Patented Dec. 27, 1910.

Application filed February 27, 1909. Serial No. 480,397.

*To all whom it may concern:*

Be it known that I, BENJAMIN W. TUCKER, a citizen of the United States, and a resident of South Orange, county of Essex, and State of New Jersey, have invented certain new and useful Improvements in Automatic Die-Presses, of which the following is a full, clear, and exact description.

This invention relates more particularly to a press for automatically cutting collars, cuffs, shirt bosoms and the like from a plurality of layers of fabric.

The primary object of the invention is to provide means whereby a die is adapted to be reciprocated, and at each reciprocating to cut a plurality of blanks from a number of layers of fabric, and to automatically feed the die a certain distance corresponding to its size transversely of a reciprocatory support or platen, and then to automatically reverse the direction of movement of the die to cause the same to return to its starting point so that the cutting of the blanks may be entirely automatic, thus overcoming the objections incident to the ordinary method of cutting blanks by hand or by shifting and moving the die by hand each time a platen is reciprocated as is the practice according to one method of cutting such blanks.

Other objects of the invention are to provide simple and efficient means for automatically feeding the layers of fabric forward after the die has moved across its support, and to so time the fabric-feeding means with relation to the movement of the die that the layers of fabric will be properly fed in position to be cut; to provide simple and efficient means for moving the die transversely of its platen or support, and to provide simple and efficient means for varying the distance of movement of the die according to the size thereof.

Another object of the invention is to provide simple and efficient means for adjusting the fabric feed according to the length or size of the die, and to provide means for varying the throw of the die so that the machine will be adapted to cut different sizes of collars, cuffs, bosoms of shirts etc.

A further object of the invention is to provide simple and efficient means for starting the machine, and which is so connected to the operating parts of the fabric feed and the die feed that it is impossible for the die or the cloth feed to be operated at the same time.

A still further object of the invention is to provide simple and efficient mechanism which is adapted to be employed in connection with the ordinary form of die press or stamping machine.

With these and other objects in view, the invention will be hereinafter more particularly described with reference to the accompanying drawings which form a part of this specification, and will then be pointed out in the claims at the end of the description.

Figure 2:
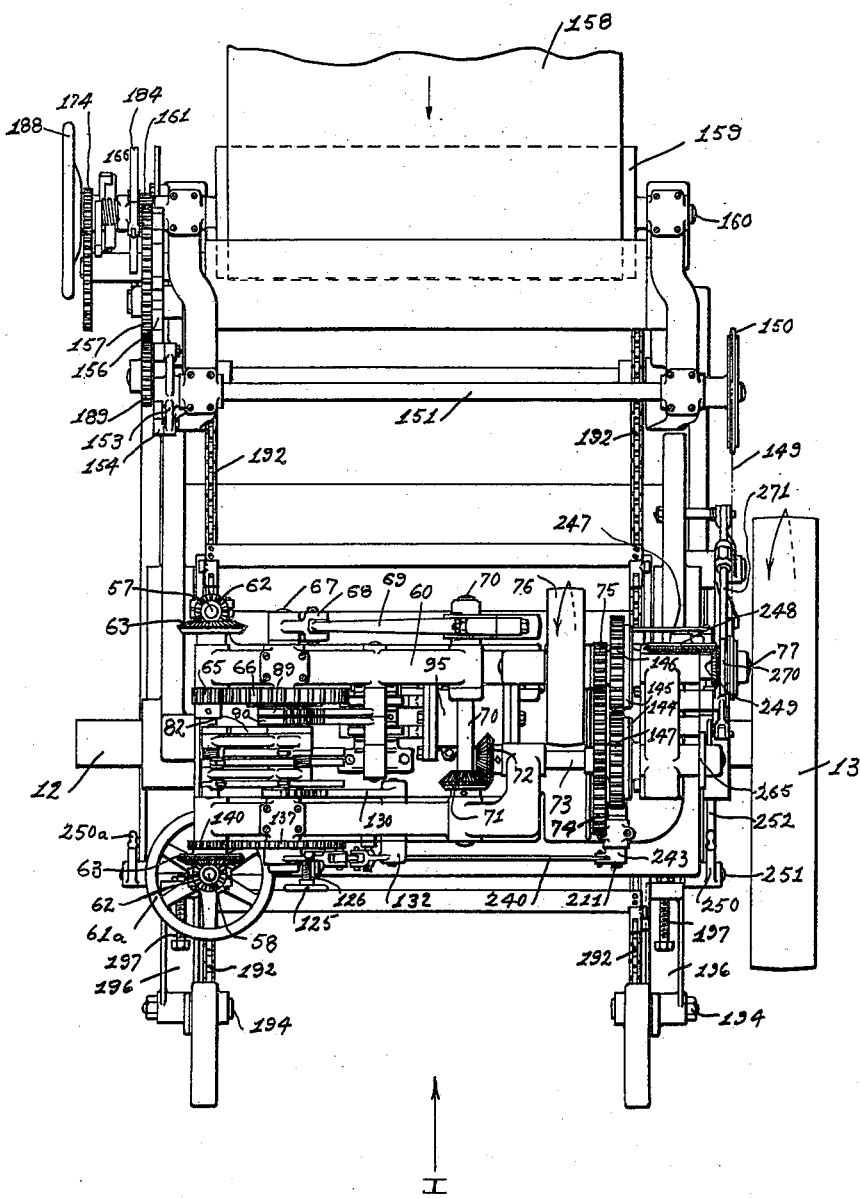
Figure 3:
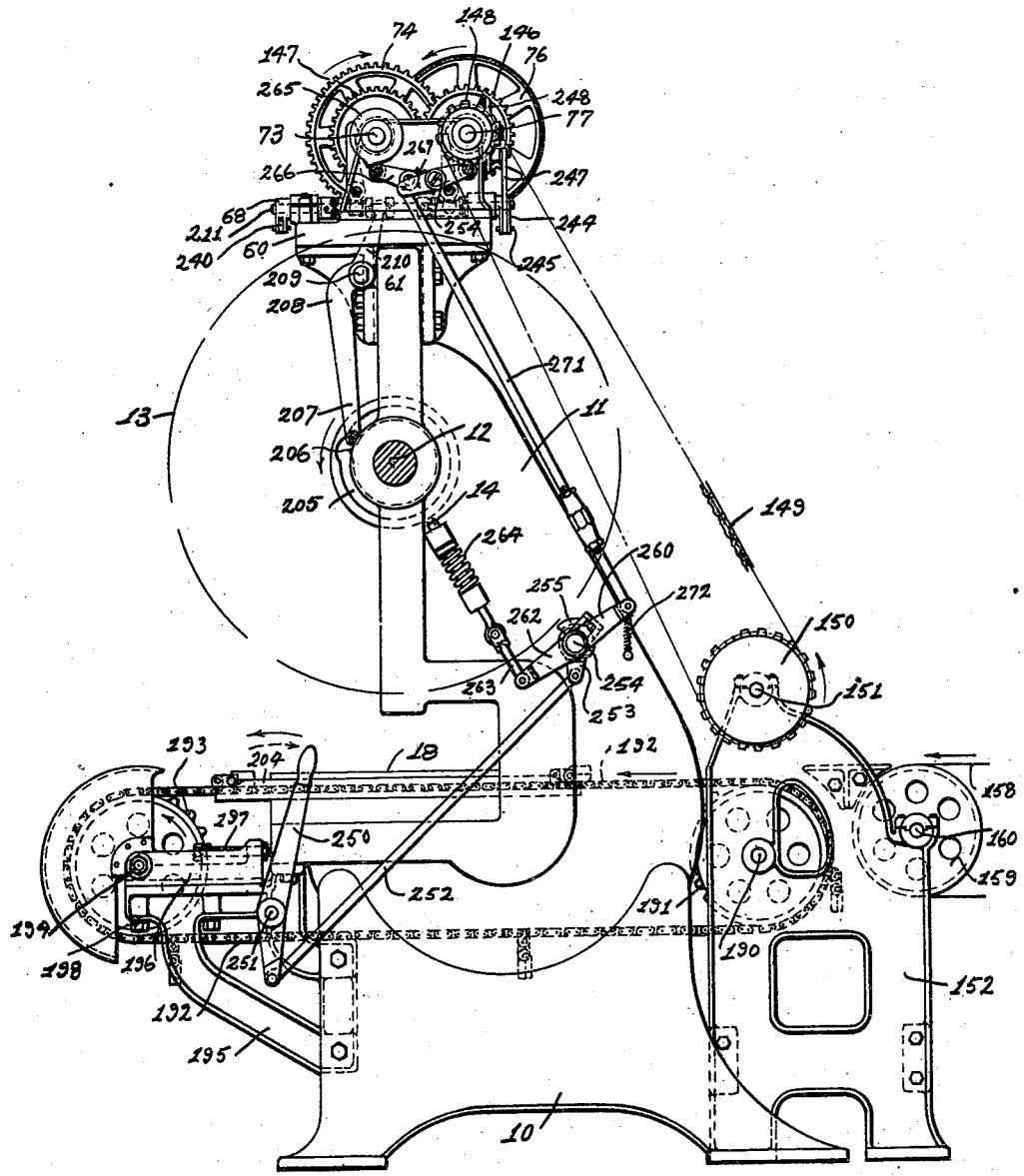
Figure 4:
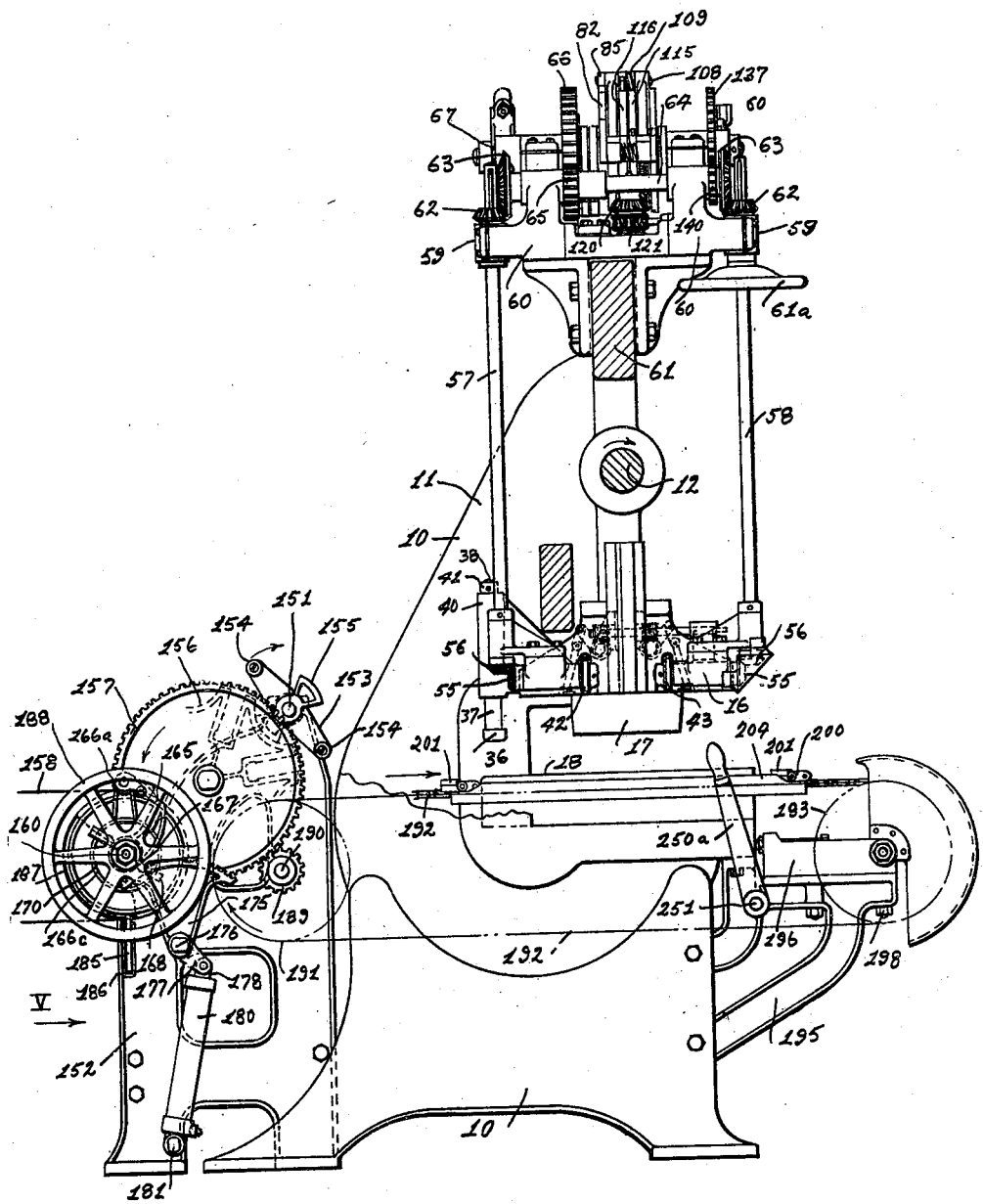

In the drawings, Figure 1 is a front elevation of one form of machine or press embodying my invention. Fig. 2 is a plan view, showing a part of the fabric feed broken away. Fig. 3 is a side elevation showing the main drive shaft in section, the said section being taken on a line III—III of Fig. 1. Fig. 4 is a vertical section, partly in elevation, taken on a line IV—IV of Fig. 1. Fig. 5 is a rear elevation showing the fabric feed and means for adjusting the same. Fig. 6 is a fragmentary plan view of a part of the means for feeding the fabric. Fig. 7 is a side elevation, partly in section, of a part of the fabric-feeding means shown in Fig. 6. Fig. 8 is a fragmentary section showing a part of the fabric-carrying chain. Fig. 9 is a transverse section of the chain shown in Fig. 8. Fig. 10 is a plan view, partly in section, of a part of the fabric-feeding means. Fig. 11 is a side elevation of Fig. 10. Fig. 12 is a transverse section taken on the lines XII—XII of Fig. 11. Fig. 13 is an enlarged side elevation, partly in section and partly broken away, of the lower part of the machine. Figs. 14 to 18 are detail views of a part of the starting mechanism. Fig. 19 is a sectional view, of a part of the starting mechanism, taken on the line XIX—XIX of Fig. 20. Fig. 20 is an elevation of a part of the starting mechanism. Fig. 21 is a fragmentary plan view of a part of the mechanism for feeding the die and the fabric. Fig. 22 is a fragmentary front elevation of the mechanism shown in Fig. 21. Fig. 23 is an enlarged fragmentary side elevation looking from the side of the machine shown in Fig. 3. Figs. 24 and 25 show one form of clutch that may be used in connection with the die and fabric-feed mechanism. Fig. 26 is a fragmentary view, partly in section and partly in elevation, showing means for causing either the die or fabric-feed mechanism to be operated. Figs. 27 and 28 are detail views of a part of the mechanism for operating the clutch dogs shown in Fig. 26. Fig. 29 is a fragmentary side elevation of a part of the mechanism shown in Fig. 26, the said parts being in a position occupied when the die feed is operating. Fig. 30 shows the position of the mechanism shown in Fig. 29 when the fabric feed is to be operated. Fig. 31 shows the dog of the fabric-feed clutch in a tripped position so that the fabric-feed may be operated. Fig. 32 is a fragmentary plan of the front portion of the machine. Fig. 33 is an enlarged fragmentary front elevation of a part of the upper structure of the machine. Fig. 34 is a vertical section taken on a line XXXIV—XXXIV of Fig. 33. Fig. 35 is a vertical section taken on a line XXXV of Fig. 34, showing a part of the mechanism for regulating the feed of the die according to the size thereof. Fig. 36 is a vertical section taken on the line XXXVI of Fig. 34, showing the means for reversing the action of the die-feed pawls. Figs. 37 and 38 are detail views of blanks or plates which may be held to a part of the mechanism to reverse the direction of movement of the die according to the size thereof and its distance of feed at each step-by-step movement. Fig. 39 is an enlarged transverse section of the mechanism and adjusting means of the feed for the die as shown in Fig. 34. Fig. 40 is a sectional plan, partly in elevation, taken on a line XL—XL of Fig. 41, and showing a part of the reversing mechanism of the die. Fig. 41 is a side elevation, partly in section, of a part of the reversing mechanism shown in Fig. 40. Fig. 42 is an enlarged sectional plan of a part of the die-feed mechanism. Fig. 43 is a vertical section taken on a line XLIII—XLIII of Fig. 42, showing a part of the clutch feed for the die in an inoperative or neutral position. Fig. 44 is a view similar to Fig. 43 except that the clutch is in one position to operate the shaft in one direction. Fig. 45 is a section of a part of the fabric-feed mechanism. Fig. 46 is a sectional plan of a part of the die-feed mechanism. Fig. 47 is a fragmentary section, partly in elevation, of a part of the die-feed operating mechanism. Fig. 48 is an enlarged fragmentary section taken on the line XLVIII—XLVIII of Fig. 13, showing the fabric feed and its adjusting mechanism. Fig. 49 is a fragmentary section, partly in elevation, of one form of ratchet feed that may be used for rotating the fabric-feed shaft. Fig. 50 is a detail perspective view of one of the clutch or ratchet dogs shown in Fig. 49. Fig. 51 is a sectional plan view through the eccentric rods for reciprocating the platen or support for the die, showing in elevation the platen or support removed from the frame. Fig. 52 is a front elevation, partly broken away, of the die platen or support removed from the frame. Fig. 53 is a fragmentary side elevation of the die support with the die thereon and means for operating the die. Fig. 54 is a vertical section taken on a line LIV—LIV of Fig. 51, showing how the die is supported to move transversely of the support. Fig. 55 is a transverse section taken on the line LV—LV of Fig. 51 showing the die held in position. Fig. 56 is an inverted plan view of the platen or die support. Fig. 57 is a transverse section, partly in elevation, of the means for adjustably holding the die to the platen or support. Fig. 58 is a plan view looking at the top of one form of die. Fig. 59 is an end elevation, partly in section, of the die shown in Fig. 58. Fig. 60 is a fragmentary side elevation of the die shown in Figs. 58 and 59. Figs. 61 and 62 are plan and side views respectively and means for adjusting the die-operating chains. Fig. 63 is a transverse section taken on a line LXIII—LXIII of Fig. 64, showing the block which enters the die to move the same transversely of the machine; and Fig. 64 is a fragmentary side elevation of the die-operating chain.

While I shall show and describe the invention as applied to a well-known form of die or stamping press in which there is a reciprocating platen, it is to be understood that the form of construction of press and operating mechanism therefor may be varied, and the construction of machine changed to adapt it for the purpose for which it is intended without departing from the character of the invention.

The frame 10 is provided with an upwardly extending part 11, and in said part 11 is rotatably held a shaft 12, on one end of which is a fly-wheel pulley 13, but rotatable independent thereof, and this fly-wheel pulley is adapted to rotate the shaft through a suitable clutch, not shown, which may be of the usual one revolution knife-clutch kind and which is adapted to place the pulley and shaft in connection so as to rotate in unison when the rod or stem 14 is moved as is usual in this construction of die presses. On the shaft 12 are eccentrics which are operatively connected by the rods 15 to a platen, head or support 16, and this support is guided at its ends in the machine frame so as to be reciprocated as the shaft 12 is rotated, and adapted to be held to the support or platen 16 is a die 17 which is adapted to cut the blanks from the layers of fabric or material placed over the cutting block 18 forming a bed for the material under the die support. The die may have the usual ejecting means for forcing the blanks therefrom after they are cut, and said die as well as the other parts referred to may be of the usual or of any preferred construction.

The fabric from which the collars, cuffs and the like are cut, is arranged in any desired way to provide a number of superposed layers, as for example forty-eight or ninety-six pieces, or of any other desired number, and these layers of the entire width of the fabric are placed over the wooden cutting block 18, as will be hereinafter described, and at each reciprocation of the cutting die a number of blanks will be cut from the fabric according to the number of layers, and as the size of collars, cuffs and the bosoms of shirts and the like vary from each other, it is necessary or desirable to adapt the machine to permit various sizes of dies to be employed.

The machine as shown is constructed to automatically feed the die along the under surface of the platen or support 16 with a step-by-step movement, and at the edge of the fabric to reverse the direction of movement of the die so that it will return to its former position and back again until the desired number of blanks have been cut, the die in each instance ejecting the blanks therefrom by the usual means provided in dies of this character.

To hold the die, or different sizes of dies, to the platen or support 16 and to automatically feed the same across the platen, I provide means for removably holding the die and for carrying the same across the platen and for feeding the die in either direction automatically. For this purpose various means may be employed. As shown, Figs. 51 to 64, the platen 16 is provided with guides 19 so that the same may be properly held in the frame during the reciprocating movement thereof, and on the under side of the platen two transverse grooves 20 and 21 are provided. Each die 17 is made hollow as usual, and may be provided with a wooden block 22, and to the block at opposite sides of the center thereof are the slides or devices 23 which have overhanging lips 24, and said slides 23 are adapted to move along the grooves 20 and 21 of the platen or support 16. A bar 25, Figs. 54, 55 and 57, extends along one edge of each of the longitudinal grooves 20 and 21, and to each bar is held a plurality of rods 26 which are arranged at an angle so that when forced outwardly they will be thrown at an angle with respect to the vertical center of the platen, in order that the inner edge of said bars may be thrown away from the die. Each bar or gib 25 has its inner edge adapted to engage under the lip 24 of the slide or device 23 and serve normally to hold the die to the platen so as to be reciprocated therewith but in such a way as to permit the die to be moved along the under face of the platen, and when the bars 25 are moved outwardly, the die may be removed or attached to the platen or another die quickly placed in its stead. Each of the rods 26 is connected by a link 27 to an arm 28, and said arms 28 are held to a shaft 29, and on said shaft is a worm gear 30 which is engaged by a worm 31, one for each worm gear, there being two parallel shafts 29, and on the shaft 32 of the worms is an operating handle or hand wheel 33 by which the shaft 32 may be rotated and thereby quickly force the bars or gibs 25 outwardly to permit the removal or the insertion of the die and to hold the same properly to the platen, the said shaft 32 being properly supported to rotate in a bracket 34 and in a transverse rib or web 35 of the platen.

A transverse bar or gripping member 36 is carried by the platen or support 16, and this bar is held to a plurality of upwardly-extending rods 37, around the stem 38 of which are arranged springs 39. The springs 39 are each located in a recess in a boss 40 on the platen, and said springs normally force the bar 36 downward, the downward movement being limited by a nut or collar 41, arranged upon each of the rods 37. The bar or gripping member 36 is adapted to engage the cloth or fabric in advance of the die and during the reciprocation thereof, to properly hold the fabric as the blanks are being cut during the withdrawal of the die.

As means for moving the die transversely of the support or platen 16, I provide two endless chains 42 and 43 forming members of a die carrier. The chain 42 is passed around the sprocket wheels 44 and 44$^a$ at each end of the platen, and the chain 43 passes around the sprocket wheels 45 and 45$^a$ similarly located to the sprockets 44 and 44$^a$, but on opposite sides of the center of the platen. The sprocket wheels 44 are secured to the shaft 46, the sprocket wheels 44$^a$ to the shaft 47, the sprocket wheels 45 to the shaft 48, and the sprocket wheels 45$^a$ to the shaft 49. The shafts 46 and 48 are in alinement, while the shafts 47 and 49 are in alinement at the opposite side of the die support or platen to the first-mentioned shafts, and when said shafts are rotated, as will be presently described, the chains will be given a like movement to carry the die therewith. Each chain 42 and 43 is provided with a lug or extension 50, Figs. 63 and 64, and these lugs are adapted to fit in an opening 51 formed in each of the slides or devices 23, and said chains may have their ends joined together by a turn-buckle connection, as 52, to adjust the chains, the latter being of the usual or of any suitable construction. The chains are so positioned as to fit in the groove 53 of the slides 23 of the die and to extend along the grooves 20 and 21 of the platen, and the platen, Fig. 57, is provided with openings 54 in the web or bracket thereof for the chains to pass through during the transverse or lateral movement of the die.

The shafts 46 and 48 on their outer ends are provided with bevel gears 55 which mesh with similar gears 56 arranged on the vertical shafts 57 and 58. These shafts 57 and 58 are suitably journaled at one end in brackets on the platen, and at their upper ends are guided in brackets 59 extending outward from the bed or frame 60 which is suitably held to the transverse beam or brace 61 of the machine frame, as shown best in Figs. 1, 3 and 4, a hand wheel 61$^a$ being provided to manually position the die by operating one of said shafts, as the shaft 58. A gear 62 has a spline and feather connection with each of the shafts 57 and 58, and each of said gears is held to rotate in one of the brackets 59 so as to permit the shafts to be reciprocated with the platen and to be rotated when the gears are rotated. Each gear 62 is in mesh with a bevel gear 63 which is held to rotate with a longitudinally-extending shaft 64 suitably journaled in the upper frame or frame member 60, and said shaft 64 is provided with a pinion 65 which is in mesh with a larger gear 66, Figs. 4, 32 to 34. The gear 66 is loosely held to a shaft 67, and this shaft is provided with an arm 68 which is connected by an eccentric rod 69 to be operated by an eccentric carried by the shaft 70. A bevel gear 71 is held to the shaft 70 and meshes with a similar bevel gear 72, Fig. 32, and said gear 72 is held to one end of a shaft 73 extending longitudinally of the machine, and suitably journaled on the upper frame member or support 60.

The shaft 73 is provided with a gear 74 which is loose on said shaft, but which may be made to rotate the latter as will be hereinafter described, and meshing with the gear 74 is a pinion 75 which is held to rotate with the fly-wheel pulley 76. This pulley 76 and pinion 75 are held to rotate loosely on a shaft 77, and said pulley 76 by suitable clutch mechanisms to be described later, may be made to rotate either of the shafts 77 or 73, and when said shaft 73 is rotated the eccentric rod 69 will be caused to rock the shaft 67 within the gear 66, the fly-wheel pulley 76 being adapted to be independently rotated of the fly-wheel 13 of the die platen, and much faster than the latter fly wheel, as for example, in a ratio of six to one or otherwise.

The gear 66 is adapted to be rotated in either direction in order that the shafts carrying the die-operating chains and the die may be moved in either direction, and with a step-by-step movement. To effect this I provide the gear 66, Figs. 32 to 35, Fig. 39, and Figs. 42 to 44, with a recess 78 forming a boss 78$^a$ in which is adapted to move a clutch or cam block 79. This clutch block 79 is adapted to fit into the recess 78, and when shifted laterally may be made to engage the inner surface of the boss 78$^a$ to cause the gear 66 to rotate in either direction according to which way the clutch block 79 is shifted and moved. The clutch block is provided with a recess or opening therethrough in which is adapted to move an eccentric sleeve 80 forming with the collar 81 an eccentric device from which projects outwardly a ratchet member 82, Fig. 47, having two engaging parts or teeth 83 and 84 which are adapted to be engaged by the pawls 85 and 86, respectively, according to which direction the ratchet member 82 is to be moved. The member 82 has substantially the form of a segment and is adapted to move the eccentric device when engaged by either of the pawls 85 or 86 and will cause the eccentric block 79 to rotate the gear 66, and said pawls 85 and 86 are carried by the arms 87 and 88 respectively, forming together substantially a bell-crank lever which is keyed to the shaft 67 so that when said shaft is oscillated by the eccentric, the rod 69 through the shaft 70, will impart a step-by-step movement to the gear 66 and the mechanism connected therewith to move the die across the platen or support.

The clutch member or block 79 has a pinion or toothed collar 89 secured thereto, and to the eccentric device is secured a similar pinion or toothed collar 90. Each of these pinions or toothed collars are engaged by the teeth of a segment 91, Figs. 46 and 47, and these segments are held to a shaft 92. A second segment 93 is movable with each of the segments 91 and each segment 93 is in mesh with a rack-bar 94, one end of which is adapted to move in a device 95. The device 95 has two cylinders 96 and 97, one for each rod or rack bar, and in each cylinder is arranged a spring 98 which extends around one end of the rack-bar 94 between the sleeves or collars 99 and 100. The sleeves or pistons 99 and 100 are slidably held in the cylinders and have a limited movement between the heads 101 and 102, and on the rack-bars are collars 103 and 104 which are adapted to alternately engage the collars or pistons 99 and 100 and compress the springs 98 when the ratchet member 82 and the clutch block or member 79 are moved, and said means serve to restore the ratchet member and the clutch block to their normal positions, the normal position of the clutch block 79 being shown in Fig. 43 entirely disengaged from the boss of the gear 66.

A second bell-crank lever 105 is secured to the shaft 67, and this lever is substantially the same as the lever formed by the arms 87 and 88 which carry the pawls 85 and 86, and said lever has the arms 106 and 107, Figs. 36 and 39, which are adapted to move with the feed pawls. The shafts or studs 108 carrying the feed pawls connect the arms of the two bell-crank levers together, and normally forcing the pawls inwardly are springs 109 which are arranged around said shafts. The bell-crank lever formed by the arms 87 and 88, and the bell-crank lever 105 form a frame for the shafts 108, on which are the pawls 85 and 86 and the arms 113 and 114, and both bell-crank levers are keyed to the shaft 67 and rock therewith. A cam plate or member 110 is located adjacent to the bell-crank lever 105, and said cam plate is adapted to reverse the direction of movement of the die by causing either of the pawls 85 or 86 to engage the ratchet member 82 according to the direction the die is to be moved. This reversing cam plate 110 forms substantially two segments extending on opposite sides of the shaft 67 and is loosely mounted on said shaft, and has its cam edges or faces 111 adapted to move in the path of rolls 112 carried by arms 113 and 114. The arms 113 and 114 are secured to the studs or shafts 108 to move with the pawls held to said shafts, and when the cam plate is in the position shown in Fig. 36, the arm 114 will be permitted to move inwardly and thereby allow the pawl 86 to engage the tooth 84 of the ratchet member 82, while the pawl 85 is held in an inoperative position by reason of the cam edge 110 raising the arm 113 and thereby holding the pawl 85 in position to oscillate without engaging the tooth 83 of the ratchet member 82. By this means it will be seen that the ratchet member 82 may be moved in either direction according to which pawl 85 or 86 engages the same, and that said movement of the member 82 will impart a like movement to the cutting die.

The dies are of different sizes for various sizes of collars, cuffs and the like, and these dies differ from each other, and if the machine is adapted for cutting these different sizes of the same article, as well as different articles, the feed of the die must be correspondingly varied. As one means to accomplish this result, I arrange between the bell-crank lever 105 and the bell-crank lever carrying the pawls 85 and 86, two oppositely moving cams 115 and 116. These cams, Figs. 35 and 39, are each adapted to be engaged by rolls 117 carried by arms 118 held to the studs 108, and said cams are held to rotate on bosses or sleeve portions of the pawl-carrying bell-crank levers. The cams 115 and 116 have a rise sufficient to lift the pawls away from the engaging teeth 83 and 84 of the ratchet member 82, and each of said cams are provided with a segmental gear portion 119, the teeth of which are opposed to each other and are engaged by a bevel gear 120 which is held to rotate with the worm gear 121 movable about the shaft or stud 122. A worm 123 engages the worm gear 121, and this worm is held to a shaft 124 on the outer end of which is an operating handle 125. The shaft 124 is threaded for a part of its distance, as at 126, and movable along the shaft is a pointer 127, and adjacent to the pointer 127 is a dial or register 128 indicating the distance the cams 115 and 116 are to be moved and consequently the throw of the die according to the size thereof. As will be seen when the shaft 124 is rotated, the worm 123 will rotate the worm gear 121 and through it the bevel gear 120, and this bevel gear by engaging the teeth of the segmental portions 119 will throw the cams 115 and 116 in opposite directions so as to permit the working pawl, whichever it may be, to engage the ratchet member 82 and move the same a certain distance according to how far the rolls 117 travel along the cams 115 and 116 without being raised to release the pawls. By this means a very quick and positive adjustment may be made for various sizes of dies according to the distance the same is to be fed and the character of the die.

To automatically reverse the direction of movement of the die through the mechanism already described, by moving the cam plate or device 110 to raise either of the pawls 85 or 86 from engagement with the teeth of the ratchet member 82, I secure to said cam plate 110 a toothed collar or pinion 129, Fig. 36, which is in mesh with the segment 130 held to a shaft 131. On the shaft 131 is a bell-crank lever 132, one arm of which, as 133, is connected by a link 134 to an arm 135 which is held to move loosely on the hub of a gear 137.

The arm 135 is provided with an engaging part 138, and this part 138 is adapted to be engaged by a plate 139 held to rotate with the gear 137, and said gear is in mesh with a pinion or smaller gear 140 carried by the shaft 64 of the die-feed mechanism, so that as the die is automatically fed, the plate 139 will be given a movement so as to engage the stop 138 of the arm 135 and rock the shaft 131 by means of the link 134 and bell-crank lever 132, and through it the segment 130 so as to throw the cam 110 in the direction to reverse or shift the position of the cam surface 111 and thereby force the previously working pawl into a non-engaging position and permit the former blank pawl to become the working pawl. When the bell-crank lever 132 is shifted in the opposite direction as will be presently described, the cam plate will be operated in a reverse direction and again shift the feed pawls so that the die will be fed in an opposite direction, thus continuing to operate the die back and forth across the platen or support with a step-by-step movement so long as the machine is in operation. The cam plate 110 and connections therewith also serve as a safety device to release the die-feed pawls and compensate for any discrepancy in the feed of the die.

The bell-crank lever 132 carries a spring-pressed pin 141 which is pointed so as to engage a depression 142, Figs. 40 and 41, in a part of the machine frame so as to frictionally hold the said lever against movement when in a certain position, except when operated through the mechanism connected therewith, and where different dies are used it is necessary that the arm 135 be operated sooner in some instances than in others, and to effect this different sizes of plates are provided as shown in Figs. 37 and 38, which are adapted to be held to the seat 143 on the gear 137 requiring thereby less rotary movement of said gear 137 in some cases than others according to the cutting die used.

The shaft 73 is provided with a clutch mechanism 144 of any suitable construction which is adapted to lock the gear 74 to said shaft to operate the die feed, and a similar or other clutch mechanism 145 is arranged on the shaft 77 to cause a rotary movement to be imparted to said shaft in a certain direction, the said clutch mechanism to be hereinafter referred to, and certain members of these clutch mechanisms are provided with the gears 146 and 147 so that they may rotate in unison and continuously. By means of the gears 74 and 75, the shaft 77 will be back geared from the pulley 76, and the clutch mechanism 145 and shaft 77 are adapted to automatically operate the cloth or fabric feed as will be hereinafter more particularly referred to.

To automatically feed the fabric or material and to properly support the same under the die in position to be cut, I arrange on the end of the shaft 77 a sprocket wheel 148, and connect the same by a sprocket chain 149 to a sprocket 150 located on a shaft 151 journaled in a frame member 152. The shaft 151, Figs. 3, 4, 5 and 13, is provided at one end with an arm 153 carrying trunnions 154 and a locking member 155 forming one member of a Geneva movement, and said trunnions are adapted to engage the slotted wheel 156 to impart a step-by-step movement thereto and to a gear 157, the said slotted wheel forming the second member of the Geneva movement. The fabric as before stated is arranged in a number of layers and is fed in a long web of layers to the machine and is supported on an endless apron or carrier 158 in the usual manner, which carrier at one end passes around a drum 159 journaled in the frame member 152. On the shaft 160 of the apron drum 159, Fig. 48, is loosely held a gear 161 which is in mesh with the gear 157 of the Geneva movement, and this gear is held to an outwardly-projecting arm 162, in the outer end of which is held a stud 163 on one end of which is a pawl 164 which is adapted to engage a projecting tooth 165 of a ratchet mechanism 166, the said pawl being normally forced in one direction by a spring 166ª. This ratchet mechanism may be of any suitable construction, and as shown is of the usual form of dog clutch which is adapted to intermittently rotate the shaft 160. The tooth or arm 165 extends outwardly from a disk member 166ᶜ, and the hub of said member is provided with notches 167 which are engaged by the inner ends of the dogs 168, and these dogs are provided with slots 169 of such form that they will pass over the rim 170 of a drum-like ratchet or clutch member 171 and cause the drum member to be moved thereby when the dogs are moved in one direction. These dogs 168 are each normally forced in one direction by a spring 172 fastened to the dog at one end and to a pin 173 carried by the toothed disk member 166, so that when the member 166 is moved by the pawl 164, a similar intermittent movement will be imparted to the drum member 171, and as said member is fixed to the shaft 160 it will impart a corresponding movement to said shaft. A pinion 174 is held to the toothed member 166, and this pinion is engaged by a segment 175 which is held to a stud 176. On the stud 176 is an arm 177, and to this arm is connected a rod 178, Figs. 13 and 45, and this rod 178 has a piston 179 held to one end thereof which is movable in a cylinder 180. This cylinder 180 is pivoted at 181 to the machine frame member 152, and this casing is provided with a cap at each end, and between one of the caps and the piston is a spring 182 which normally forces the piston and arm in one direction, so that when the member 166 is forced by the pawl to impart a movement to the shaft 160 through the drum member 171, the segment through the spring 181 will force the toothed member 166 back to its normal position ready to be again engaged by the pawl 164. By this means the apron drum and the apron will be given a step-by-step movement by the ratchet mechanism and the Geneva movement already described, and this will feed the fabric forward a certain distance according to the throw of the ratchet mechanism.

As with the feed of the die the feed of the fabric must vary according to the size of the die and the length or distance the layers of cloth are to be moved each time the die has been moved the entire distance across the face of the support or platen 16. This may be accomplished in various ways. As shown best in Figs. 4, 13 and 48, the stud or shaft 163 carrying the pawl 164 has on its end opposite the said pawl an arm 183, on one end of which may be arranged a roll which is adapted to travel around the periphery of a cam or cam plate 184. This cam or cam plate 184 is independently rotatable on the hub of the arm 162, and at one side thereof is fastened a handle 185 to which is held a latch or fingering piece 186 which is adapted to engage the teeth of a segment 187 held to the frame member 152. By releasing the dog or fingering piece 186 from the teeth of the segment 187, the cam plate 184 may be shifted around the shaft 160, and the position of the cam with relation to the tooth 165 will determine how far the pawl 164 is to move the same and consequently the shaft 160. That is the throw of the arm 162 is the same each time and the cam is positioned to cause the arm to raise the pawl 164 from engagement with the tooth 165 at any desired point, thus the feed of the fabric may be varied or the fabric may be fed by hand by rotating the shaft 160 through the hand wheel 188 secured to the end of the shaft, as the drum member 171 will permit this movement of the shaft owing to the same slipping through the slots of the dogs 168.

The gear 157 meshes with the pinion 189 secured to a shaft 190, and on the shaft 190 are sprocket wheels 191 around which pass the chains 192, and said chains pass around sprocket wheels 193 held to a shaft 194 journaled in a bracket 195 forming a part of the machine frame. The bracket 195 may comprise two members in one of which, as 196, is journaled the shaft 194, and this member 196 of the bracket 195 is adapted to be adjusted longitudinally of the machine to compensate for the stretch of the chains 192, the latter serving as a carrier for the forward end of the web of layers of fabric. The members 196 may be adjusted by means of a bolt 197 which may be held to the bracket by means of the bolts 198 as shown best in Fig. 13. The chains 192 are provided at intervals with upwardly-extending lugs 199 to which are pivoted the arms 200. These arms 200 are connected by cross bars or devices 201 which are held to the arms 200 by screws or otherwise, and carried by the arms are studs 202 on which are rollers 203. These rollers are adapted to ride along a track 204 formed by rails located on opposite sides of the machine adjacent to the cutting block so that when the rolls reach the track 204 they will be elevated to the position shown in Fig. 7, and each bar will thereby lift the layers of fabric with an action similar to the action of pulling the layers forward by hand as is the usual practice. The chains 192 move the same distance at each movement so that the devices 201 will always be positioned on opposite sides of the cutting blocks and not interfere with the die, and such movement may be at the same speed as the fabric carrier 158.

The die-feed shaft 73 and the fabric-feed shaft 77 are timed with relation to the movement of the platen drive shaft 12, but the rotation of each so controlled that no two of the shafts can operate simultaneously. As shown the shaft 12 is provided with a grooved cam 205, Figs. 22 and 23, which groove extends outward, as at 206, at a point near where the shaft 12 completes its revolution, and engaging this groove is a trunnion carried by the arm 207 of a lever 208. This lever 208 is pivoted at 209 to the upper frame member and has its other arm 210 bifurcated so as to span a shaft 211 between the collars 212 secured thereto, so that said shaft may be given a longitudinal movement by the cam 205. The shaft has a spline and feather connection with the rotatable sleeves 213 and 214 which are held in brackets of the upper frame member, and secured to the shaft 211 is a collar 215 which has projections 216 which are adapted to enter recesses 217 formed between projections 218 carried by a sleeve or device 219 to engage said projections. The device 219 is slotted, as at 220, and this slot is engaged by the end 221 of a dog 222. The dog 222 is pivoted at 223, and has its end, as 224 adapted to engage a tooth 225 extending outwardly from the disk or collar 226 of the die-feed clutch mechanism 144, so that when the dog is in the position shown in Fig. 28, the die-feed shaft 73 will be held stationary, but as soon as the dog is released from the tooth 225, the shaft and clutch mechanism will rotate together in the usual manner, the dog being forced in one direction by a spring 227 fastened at one end to the frame and its other end to the dog. As will be seen the dog will permit one revolution of the shaft 73, and will then stop the same. A similar disk 228 is arranged on the fabric-feed shaft 77, and projecting outward from this collar or disk is a tooth 229 which is adapted to be engaged by the dog 230, Figs. 26 and 31, so as to cause the shaft 77 to be rotated when engaged as shown in Fig. 26, and this dog 230 is normally forced in one direction by a spring 231 and has its end 232 entering a slot 233 in a sleeve member or device 234. The sleeve member 234 is provided with teeth or projections 235 forming recesses or spaces between the same, and the sleeve 213 is provided with projections 238 forming spaces between them in which are adapted to enter the spaced projections 239 on one end of the sleeve or device 234.

As will be seen when the shaft 211 is moved by the lever 208 through the cam 205 and the shaft 12, the shaft 211 being in the position shown in Fig. 26, the projections 216 of the collar 215 will engage the teeth 218 on the sleeve or device 219 and will shift the latter so as to release the dog 222 from the tooth 225, at the same time the projections 236 of the collar 237 will enter the recesses between the teeth 235 of the sleeve or device 234 so that the dog 230 will remain in the position shown in Fig. 26. If, however, a partial rotary movement be given to the shaft 211 as shown in Fig. 31 and the shaft 211 reciprocated, the teeth or projections of the collar 215 will enter the recesses between the teeth 218 of the device 219 when moving the shaft 211, but the projections 236 of the collar 237 being now opposed to the projections 235 of the device 233 will shift said device with the shaft 211 and will move the dog 230 as shown in Fig. 31, so as to trip the same and permit the clutch mechanism of the fabric feed to rotate the shaft 77 and thereby impart movement to the fabric-feed mechanism through the sprocket 148 held to the end of said shaft 77 as already described.

It will be seen by the mechanism just described that the shafts 73 and 77 have their rotation automatically controlled, and each shaft is timed properly with respect to the other shaft so that both shafts cannot rotate at the same time.

The shaft 211 may be rocked or oscillated in the sleeves 213 and 214 in any desired way. For moving the same in one direction, the bell-crank lever 132 is connected by a rod 240, and this rod is slotted, as at 241, at one end, Figs. 29 and 30, in which is a pin or bolt 242 carried by an arm 243 projecting downward from the sleeve 214, and on the sleeve 213 is an arm 244 which has a pin or bolt 245 movable in the slot 246 of a rod or link 247 which is pivoted at one end to a bevel gear 248, Figs. 21 and 22, and this bevel gear is in mesh with a smaller bevel gear 249 carried by the fabric-feed shaft 77. The bevel gear 248 makes a half revolution and then stops, and said gear and the gear 249 may be in the proportion of two to one and are so arranged that when the shaft 77 rotates it will move the arm 244 at the proper time to rock the shaft 211, while the shaft may be rocked in the opposite direction by the rod 240 and arm 243. The slots of the rods 240 and 247 provide a form of floating connection with the arms 243 and 244 respectively, and the movement of the shaft 211 is not simply back and forth but it has two distinct movements in each direction, that is said shaft is given a partial rotary movement and then stops to permit the shaft to be reciprocated to trip the cloth feed, and a further movement is given to said shaft 211 in the same direction by the rod or link 247 for the die feed. This movement occurs at the extreme movement of the die in one direction along the support, and at its extreme throw in the opposite direction along its support, the shaft 211 is given two distinct movements in the opposite direction to again operate the cloth feed and after the cloth feed to operate the die feed as already explained. The die and the fabric-feed mechanism are thus properly timed with respect to the shaft 12, and the shaft 73 of the die-feed and the shaft 77 of the fabric-feed mechanism properly timed with respect to the reversing mechanism previously described for the die feed.

The machine may be started in any desired way, and the rotation of the shaft 12 controlled by the movement of the die-feed shaft 73 and the cloth or fabric-feed shaft 77. As shown levers 250 and 250$^a$, Figs. 1 and 3, are held to a shaft 251 on opposite sides of the machine and one end of the lever 250 is connected by a rod or link 252 to an arm 253 which is loosely held on a stud 254. This arm 253 has a cam portion 255, Fig. 15, and this cam portion is provided with a cam groove 256 in which the end 257, Fig. 14, of a locking block 258 is adapted to travel, and this locking block is provided with an end 259 which is adapted to enter an aperture in a lever 260 which is also loosely held to the stud 254. The body of the locking block 258 passes through a slot or opening 261 of the lever 262 which is held to the stud 254 so that by means of said locking block 258, the arm 260 and the arms 253 and lever 262 may be held to move in unison when the pin 259 engages the lever 260, but when disengaged therefrom only the arm 253 and lever 262 move together. A link 263 is connected at one end to the lever 262, and its other end to the rod 14 which is normally forced into engaging position by means of the spring 264 so that when the lever 250 is moved in the direction indicated by the solid arrow the machine may be started by releasing the rod 14 as is usual in die presses of this character, while moved in the direction shown by the dotted arrow or that shown in Fig. 3, the machine will be stopped.

A cam 265 is secured to the outer end of the die-feed shaft 73 and adapted to be moved by said cam is an arm 266, Figs. 3, 21 to 23, and this arm or lever 266 is provided with a segment 267 which meshes with the segment 268 carried by a lever 269. The lever 269 has a trunnion at one end adapted to rest against a cam 270 carried by the shaft 77 to operate the same in one direction, and the other end of said lever is connected by a rod 271 to the lever or arm 260, the latter being normally forced in one direction by means of a spring 272. When the lever 250 is moved to start the machine it will force the rod 252 to throw the pin 259 of the locking block 258 into engagement with the arm 254, and when the shaft 73 is rotated to feed the die, the cam 265 will move the arm 266 and through the segments 267 and 268 will raise the rod 271 and this movement of the rod will release the clutch engaging rod or stop 14, thus as long as the lever is moved to starting position, the shaft 12 will control the die-feed shaft 73, and the fabric-feed shaft 77, and the shaft 73 or the shaft 77 will in turn automatically actuate the clutch of the shaft 12 to again rotate said shaft 12, the cam groove 256 of the lever 253 being such as to permit the arms 260 and 262 to move properly.

The clutch mechanisms 144 and 145 are the same in construction except as to the position of the teeth of the disks or members 226 and 228. These clutch members are loose on their shafts. A collar 273 is secured to each of the shafts 73 and 77, and this collar carries a pawl 274 which is adapted to engage the teeth 275 forming a part of one of the gears 146 or 147, and carried by the collar 273 is a spring 276 which is arranged to force the pawl 274 at the proper time into engagement with the teeth 275. The pawl 274 is pivoted to the collar 273 and has one end adapted to be engaged by a spring-pressed bolt 277. This bolt 277 is normally forced outward by the spring 278 which is of greater tension than the spring 276, and said bolt is arranged in a boss 279 carried by a disk 280, Figs. 21 and 22, which is loosely arranged on the shaft 168. The spring 276 normally forces the pawl 274 into engagement with one of the teeth 275, the stop 281 carried by the disk 280, at this time engaging the projections or tooth 282 of the collar 273, and the pin or bolt 277 resting against a part of the pawl 274. When either of the dogs engage its tooth it will stop the disk 280 from rotating and will also stop the parts carried thereby. The pin or bolt 277 will now compress the spring 276 and will force the pawl 274 out of engagement with the teeth 275 allowing the gear to rotate independent of its shaft.

The construction and operation of the invention will be readily understood from the foregoing description when taken in connection with the accompanying drawings. Assuming that the fabric has been properly spread so as to form a number of superposed layers upon the traveling apron or carrier 158 and then drawn forward by hand or otherwise before starting the machine so as to be placed under the die 17 over the cutting block 18, and the starting lever 250 operated in the direction indicated by the solid arrow in Fig. 3, it will be seen that the rod 252 will force the arm 253 so as to cause the pin 259 of the locking block 258 to engage the arm 260 and lock the same thereto, and at the same time the arm 262 will withdraw the stop or rod 14 from the clutch member so that the shaft 12 will be rotated to reciprocate the platen or support 16 and force the die through the layers of fabric to cut the blanks therefrom, it being understood that the belt fly-wheel 13 of the die-reciprocating means as well as the belt fly-wheel 76 for driving the die-feed and fabric-feed mechanism are constantly and independently driven by belt or otherwise. If the die is at the extreme position or starting point as shown in Fig. 1, the position of the die-feed mechanism will be such that on the last part of the movement of the shaft 12, the cam 205 will actuate the lever 208 and cause a shifting movement of the shaft 211, Figs. 26 and 31, and this will trip the pawl 222 to release it from the tooth 225 carried by the wheel or disk 226, and this will cause the clutch mechanism 144 to rotate the shaft 73. This rotary movement of the shaft 73 will rotate the transversely-extending shaft 71 of the die-feed mechanism and through the eccentric rod 69 will rock the arm 68 and shaft 67, and said shaft will rock the ratchet feed bell-crank lever formed by the arms 87 and 88, Fig. 47, and will cause one of the pawls, as 86, to engage the teeth of the ratchet member 82, and this will cause the eccentric sleeve 80 to throw the clutch block 79 to the position shown in Fig. 4. This will cause the gear 66 to rotate the pinion 65, and by means of the pinion 65 to rotate the transversely-extending shaft 64 and through the bevel gears 63 and 64 will rotate the shafts 57 and 58. These shafts 57 and 58 will rotate the shafts 46 and 48, and these will impart movement to the die-carrying chains 42 and 43, and thus move the die with a step-by-step movement across the platen or support 16 at each revolution of the shaft 73. This step-by-step movement will continue until the die reaches the extreme throw or movement and at the last feed of the die the reversing mechanism is set so that the die may be moved in a reverse direction, and at the last part of the upward stroke of the platen and die, the fabric-feed mechanism is operated to carry the fabric forward a distance sufficient for the next set of blanks. At or near the end of the stroke of the die when returning, the die will be forced one throw in the reverse direction and this movement will continue until the die returns to its former position as already explained.

The reversing mechanism is set through the action of the gear 137 which causes one of the plates 139 to engage the part 139 of the arm 135 and through the link 134 will operate the arm 133 of the bell-crank lever held to the shaft or stud 131. The shaft 131 carries the segment 130 and this will shift the cam plate 110 and raise the pawl 86 to a blank position and permit the pawl 85 to assume a working position. After the reversing mechanism has been set as before stated, the fabric-feed mechanism is operated through the arm 132 of the bell-crank lever which is connected by a rod 240 to the arm 243 on the shaft 211, and this will permit the lever 208 to trip the dog 230 and disengage the same from the tooth 229 on the disk or wheel 228 of the clutch mechanism 145 and will cause the shaft 77 to be operated one revolution. The shaft rotates the sprocket chain 149 and said chain rotates the shaft 151 and this will cause the Geneva movement to impart a like movement to the shaft 190 and the gear 161 held to rotate loosely on the shaft 160 of the fabric feed. The gear 161 moves the arm 162 and through the ratchet-and-pawl mechanism already described will impart a step-by-step movement to the shaft 160 and this will rotate the apron drum and will force the layers of fabric forward according to the distance the same is moved. At the same time that the fabric-supporting apron is moved, the shaft 190 will cause the endless chains 192 to be moved, and this movement of the chains will be somewhat larger than that of the carrier conveyer belt. The chains will cause the transverse bars 201 carried thereby to be placed at an angle as shown best in Fig. 7 as it travels along the track 204, and this movement will carry the forward end of the layers of fabric in proper position for the cutting die, the said cloth being held during the cutting operation by means of the transverse bar or device 36 carried by the die platen or support.

The fabric feed as well as the die feed may be adjusted to suit dies of different sizes as already explained, and the dies may be detached from the platen or support by the mechanism referred to.

By the term "die" any knife or device for cutting or operating on the material is intended, and the term is not confined to the character of die shown and described.

From the foregoing it will be seen that effective means are provided whereby a die is adapted to cut a number of blanks from a number of superposed layers of fabric and, to be automatically fed so as to cut the blanks successively; that simple means are provided for automatically reversing the direction of movement of the die; that simple means are provided whereby different sizes or forms of dies may be readily held to the support; that simple and efficient adjusting mechanism is provided for differing the length or distance of feed of the die according to the size thereof; that simple and efficient means are provided for automatically feeding the fabric after the die has cut the blanks across the fabric; that means are provided whereby the action of the die, the fabric feed and the movement of the die to cut the blanks are so controlled and coöperate in such a way that it is impossible for the die feed, fabric feed or the movement of the die to operate except at the proper time and to be controlled through mechanism connected with each other, and that the mechanism is so constructed that it may be attached to a well-known form of die press as an attachment thereto without entirely reconstructing the same.

Having thus described my invention, I claim as new and desire to secure by Letters Patent:—

1. In a fabric cutting machine, the combination with means for supporting a die, of means for reciprocating the die-supporting means, die feed mechanism, means for reversing the direction of movement of the die feed, fabric feed mechanism, and means whereby the action of the die feed, the fabric feed and the movement of the die in cutting will be controlled one by the other.

2. In a fabric cutting machine, the combination with means for supporting a die, of means for moving the die-supporting means, die feed mechanism, fabric feed mechanism and means whereby the action of the die feed, the fabric feed and the movement of the die in cutting will be timed to operate at different periods and one controlled by the other.

3. In a fabric cutting machine, the combination with means for supporting a die, of means for reciprocating the die, die-supporting means, die feed mechanism, means for reversing the direction of the die feed, means for supporting layers of fabric in the path of movement of the die, and means whereby the movement of the die in cutting and the movement of the die feed will be controlled one by the other.

4. In a fabric cutting machine, the combination with means for supporting a die, of means for moving the die-supporting means, and die feed mechanism for imparting a step-by-step movement to the die along the supporting means.

5. In a fabric cutting machine, the combination with a support for a die, of means for reciprocating the die-support feeding means for moving a die with a step-by-step movement along the support, and fabric feed mechanism for moving the work transversely to the direction of movement of the die timed to operate with relation to the movement of the die feeding means.

6. In a fabric cutting machine, the combination with a die support, of means for reciprocating the die support, die feed mechanism for moving a die with a step-by-step movement in either direction along said support, means for reversing the direction of the die feed, and means for automatically feeding a plurality of layers of fabric in the path of movement of the die.

7. In a fabric cutting machine, the combination with a die support, die feed mechanism for moving the die along the support in either direction, fabric feed mechanism, and means whereby the die feed and the fabric feed will be timed to operate at different periods and one controlled by the other.

8. The combination with a support, of means for reciprocating said support, mechanism for moving a die across the face of the support in either direction, reversing mechanism, means for adjusting the length of feed of the die, fabric feed mechanism, means for adjusting the length of feed of the die, means for adjusting the length of feed of the fabric according to the size of the die, and means for controlling the movement of the die feed, fabric feed and cutting movement of the die by the movement of each other.

9. The combination with a die support, of means for moving said support, a carrier for moving the die across the face of the support in either direction, mechanism for moving the carrier, reversing mechanism, means for adjusting the length of feed of the die, fabric feed mechanism and means for adjusting the length of feed of the fabric according to the size of the die.

10. The combination with a die support, of means for reciprocating said support, a carrier located on the support for moving the die with a step-by-step movement across the face of the support, mechanism for moving the carrier, means for varying the length of feed of the die, fabric feed mechanism, and means for controlling the movement of the die feed, cloth feed and cutting movement of the die by the movement of each other.

11. The combination with a die support, of means for reciprocating said support, mechanism for moving a die across the face of the support in either direction, reversing mechanism, means for adjusting the length of feed of the die, fabric feed mechanism, and means for adjusting the length of feed of the fabric according to the size of the die.

12. The combination with a die support, of means for moving said support, a carrier mounted on the support for moving the die across the face of the support in both directions, means for imparting a step-by-step movement to the carrier, reversing mechanism automatically changing the direction of movement of the carrier at each end of travel of the die, and fabric feed mechanism automatically controlled through the means for operating the carrier.

13. The combination with a die support, of means for reciprocating said support, mechanism for moving the die across the face of the support in either direction with a step-by-step movement, reversing mechanism to reverse the action of the die after a series of movements, and means for adjusting the length of feed of the die.

14. The combination with a die support, of means for reciprocating said support, a carrier mounted on the support for moving the die across the face of the support in either direction, independent means for operating the carrier with a step-by-step movement, reversing mechanism for changing the direction of movement of the carrier after a series of movements, and means for varying the length of feed of the die.

15. The combination with a reciprocatory support, of a die held to said support, and means for imparting a step-by-step movement to the die in one direction and then a step-by-step movement in the opposite direction.

16. The combination of a movable support, a die, means for imparting a step-by-step movement to the die along said support, and means for automatically imparting a step-by-step movement in the opposite direction.

17. The combination with a reciprocatory support, of a die feeding means, a part of which is mounted on said support for moving the die back and forth with a step-by-step movement along the same, and means for automatically reversing the direction of movement of said feeding means after a series of movements.

18. The combination with a movable die adapted to cut a number of blanks from fabric, of means for imparting a step-by-step movement to the die, and means for automatically feeding the fabric transversely to the direction of feed of the die in position to be cut by the die and timed with relation to the movement of said die.

19. The combination with a movable support, of a die adapted to cut blanks from fabric, means for imparting a step-by-step movement to the die in both directions along the support, and means for automatically feeding the fabric in position to be cut by the die.

20. The combination of a reciprocatory and laterally movable die, means for imparting a step-by-step movement to said die, and means for automatically feeding fabric in position to be cut by the die and timed with relation to the movement and after a series of movements of said die.

21. The combination with a die having engaging devices at one part thereof, of a movable support for the die, means for moving said support, and means engaging said devices adapted to move the die along said support with a step-by-step movement.

22. The combination with a die having engaging devices at one part thereof, of a reciprocatory support for the die, means for moving said support, and a carrier having a step-by-step movement engaging said devices moving the die along said support with a step-by-step movement.

23. The combination with a die having engaging devices at one part thereof, of a support for the die, means for moving said support, a carrier mounted on said support and engaging said devices to move the die along said support independent of the movement of said support, and means for imparting a step-by-step movement to said carrier.

24. The combination with a fabric cutting die having devices on one face thereof located on opposite sides of its longitudinal center, said devices having overhanging lips, of a movable support having grooves in which said devices are adapted to move, bars adapted to fit said grooves and forming guides for the die and adapted to engage under the lips of the devices of the die, and means for moving the bars whereby the die may be released and another placed in its stead.

25. The combination with a fabric cutting die having devices on one face thereof, said devices having overhanging lips, of a movable support having grooves into which said devices are adapted to fit, bars adapted to fit said grooves and forming guides for the die, and means for moving the bars whereby the die may be quickly removed.

26. The combination with a die, of a movable die support having grooves into which said devices are adapted to fit, bars forming guides for the die, and means for moving the bars to release the die or to hold the same to the support.

27. The combination with a die, a movable die support having grooves into which said devices are adapted to fit, bars adapted to fit said grooves and forming guides for the die, means for moving the die laterally along said bars, and means for moving the bars to release said die.

28. The combination with a movable support having parallel grooves on one face thereof, of a die provided with devices adapted to travel in said grooves, said devices having openings therein, endless chains forming a carrier having means to enter said openings, and means for imparting a step-by-step movement to the chains in either direction.

29. The combination with a reciprocatory support having parallel grooves on one face thereof, of a die provided with devices adapted to travel in said grooves along the support, endless chains forming a carrier having means to engage the die, and means for imparting a step-by-step movement to the chains.

30. The combination with a movable support, of means for supporting the work, a laterally movable die, means for giving a step-by-step movement to the die along the work, and means including a movable guide for the die and serving to detachably hold the die to the support.

31. The combination with a reciprocatory support, of a laterally movable die and angularly movable bars forming guides for the die and adapted to removably hold the die to the support.

32. The combination with a reciprocatory support having parallel grooves on one face thereof, of a die having devices adapted to fit said grooves, endless chains having means adapted to engage said devices, means for imparting a step-by-step movement to the chains in either direction, together with means for detachably holding the die in the grooves of said support.

33. The combination with a reciprocatory support having parallel grooves on one face thereof, of a die having devices adapted to fit said grooves, endless chains having means adapted to engage said devices, means for imparting a step-by-step movement to the chains in either direction, together with bars for detachably holding the die in the grooves of said support.

34. The combination with a reciprocatory support, of a laterally movable die, endless chains having means to engage said die, means for imparting a step-by-step movement to the chains in either direction, together with bars arranged in parallel relation for detachably holding the die on said support.

35. The combination with a reciprocatory support, of a die having devices thereon, means for moving the die, guiding bars adapted to engage a part of said die to hold the same to the support, rods angularly arranged with respect to the die to force said bars to holding or releasing position, a plurality of shafts, arms connected to said shafts, links connecting said arms to the angularly arranged rods, worm gears held to the shafts, worms engaging said gears, and a rod for rotating the worms whereby the die may be detachably held to its support.

36. The combination with a reciprocatory support, of a die having devices thereon, means for moving the die, guiding bars adapted to engage a part of said die to hold the same to the support, rods angularly arranged with respect to the die to force said bars to holding or releasing position, and means for moving said rods.

37. The combination with a movable support, of means for laterally moving a die, guiding bars adapted to engage a part of said die to hold the same to the support, rods angularly arranged with respect to the die to force said bars to holding or releasing position, two parallel shafts, arms held to each shaft and connected to the angularly arranged rods, and means for operating said shafts whereby the die may be detachably held to its support.

38. The combination with a movable support, of means for moving a die, guiding bars adapted to engage a part of said die to hold the same to the support, rods for forcing said bars to holding or releasing position, a plurality of shafts, arms held to said shaft and connected to said rods, and manually operated means for operating the shaft.

39. The combination with means for supporting a fabric, of a reciprocatory support, a die laterally movable along said support, means for moving the die with a step-by-step movement in either direction along the support, together with a spring-pressed device carried by the support and adapted to engage the fabric during the cutting movement of the die.

40. The combination with means for supporting the material to be cut, of a movable support, a die movable along said support, means for moving the die with a step-by-step movement in either direction along said support, together with a yieldingly held bar carried by the support and adapted to engage the material during the cutting movement of the die.

41. The combination with a reciprocatory support, of means for supporting the fabric under said support, means for imparting a step-by-step movement to the die in either direction along said support, a die laterally movable on said support, a bar carried by the support, and located adjacent to the die, a plurality of rods projecting from the bar and movable in recesses in said support, and a spring surrounding each of said rods and normally forcing the bar in a direction to engage the fabric.

42. The combination with a movable support, of means for supporting the material to be cut under said support, a die laterally movable on said support, means for imparting a step-by-step movement to said die in either direction along said support, a bar carried by the support and located adjacent to the die, a plurality of rods projecting from the bar and movable in said support, and means normally forcing the bar in a direction to yieldingly engage the material.

43. The combination with a reciprocatory support, of means for holding a die to said support, an endless carrier carried by said support and adapted to move the die, shafts, gear connections whereby the carrier may be moved, together with means for moving the shafts in either direction so as to impart a like movement to the carrier.

44. The combination with a reciprocatory support, of means for holding a die to said support, endless chains carried by said support and adapted to move the die, rotary and reciprocatory shafts, gear connections whereby the carrier may be moved by the shafts, together with means for moving said shafts in either direction so as to impart a like movement to the carrier.

45. The combination with a reciprocatory support adapted to hold a die, means for moving the die, means for supporting fabric under the die, a shaft for imparting movement to said support, a shaft, clutch mechanism arranged on said shaft and controlled by the movement of the first-mentioned shaft, and mechanism operated by the second shaft to impart a step-by-step movement to the die-moving means.

46. The combination with a movable support adapted to hold a die, means for laterally moving the die, means for supporting the material under the die, a shaft for imparting movement to said support, a second shaft, clutch mechanism arranged on said second shaft and controlled by the movement of the first-mentioned shaft, and mechanism operated by the second shaft to impart a step-by-step movement to the die-moving means.

47. The combination with a reciprocatory support adapted to hold a die, means for moving the die laterally along the support, means for supporting fabric under the die, a shaft, clutch mechanism arranged on said shaft and controlled during the reciprocatory movement of said support, and mechanism operated by said shaft to impart a step-by-step movement to the die-moving means.

48. The combination with a reciprocatory support adapted to hold a die, of means arranged on said support for moving the die, a shaft, clutch mechanism arranged on said shaft, means whereby the clutch mechanism may be made to rotate said shaft, a transversely-extending rock shaft, connections between the clutch operated shaft and the rock shaft to operate the latter, a plurality of arms held on said shaft and carrying oppositely arranged pawls, a ratchet member having teeth adapted to be engaged by said pawls, a gear, a clutch block adapted to engage the gear to move the latter in either direction, means for actuating the pawls so as to release one and place the other in operative position with respect to the ratchet member to cause the gear to be rotated in either direction according to which pawl engages the ratchet member, means for determining the distance the pawl should throw the ratchet member, together with connections between the gear and the die-moving means whereby the die may be given a step-by-step movement in either direction across the support.

49. The combination with a reciprocatory support adapted to hold a die, of means arranged on said support for moving the die, a shaft, clutch mechanism arranged on said shaft, means whereby the clutch mechanism may be made to rotate said shaft, a transversely-extending rock shaft, connections between the clutch operated shaft and the rock shaft to operate the latter, a plurality of arms held on said shaft, pawls carried by said arms, a ratchet member having teeth adapted to be engaged by said pawls, a gear, a clutch block adapted to engage the gear to move the latter in either direction, means for actuating the pawls so as to release one and place the other in operative position with respect to the ratchet member to cause the gear to be rotated in either direction according to which pawl engages the ratchet member, together with connections between the gear and the die-moving means whereby the die may be given a step-by-step movement in either direction across the support.

50. The combination with a support adapted to hold a die, of means arranged on said support for moving the die, a shaft, means for rotating said shaft, a transversely-extending rock shaft, connections between the first-mentioned shaft and the rock shaft to operate the latter, an arm held on said shaft, a pawl movable with the arm, a ratchet member adapted to be engaged by said pawl, a gear, a cam block adapted to engage the gear to move the latter in either direction, together with connections between the gear and the die-moving means whereby the die may be given a step-by-step movement in either direction.

51. The combination with a reciprocatory support adapted to hold a die, of means arranged on said support for moving the die, a transversely-extending rock shaft, means for rocking said shaft, a plurality of arms held on said shaft, oppositely arranged pawls carried by said arms, a ratchet member adapted to be engaged by said pawls, means for actuating the pawls to release one and place the other in operative position with respect to the ratchet member, together with connections between the ratchet member and the die-moving means for giving a step-by-step movement to the die in either direction.

52. The combination with a reciprocatory support adapted to hold a die, of means arranged on said support for moving the die, a rock shaft, means for rocking said shaft, a plurality of arms held on said shaft and carrying pawls, a ratchet member adapted to be engaged by said pawls, means for actuating the pawls so as to release one and place the other in operative position with respect to the ratchet member to cause said member to be moved in either direction according to which pawl engages said ratchet member, means for determining the distance the pawls should throw the ratchet member, together with connections between the ratchet member and the die-moving means for operating the latter.

53. The combination with a reciprocatory support adapted to hold a die, of means arranged on said support for moving the die, a plurality of movable arms, pawls movable with said arms, a ratchet member adapted to be engaged by said pawl, means for actuating the pawls so as to release one and place the other in operative position with respect to the ratchet member, means for determining the distance the pawl should throw the ratchet member, together with connections between the ratchet member and the die-moving means for giving a step-by-step movement to the die in either direction.

54. The combination with a reciprocatory support adapted to hold a die, of means arranged on said support for moving the die, a rock shaft, means for operating said shaft, ratchet mechanism, means for determining the throw of said mechanism, and means operated by said mechanism for imparting a step-by-step movement to the die.

55. The combination with a movable support adapted to hold a die, of means mounted on the support adapted to engage the die and move the latter therewith, a rock shaft, means for moving said shaft, a gear independently movable on said shaft, connections between the gear and the die-moving means of the support, said gear being provided with a recess therein, a clutch block fitting said recess and adapted to move in either direction to impart a like movement to said gear, an arm having an eccentric sleeve fitting said block, together with means for moving said arm.

56. The combination with a movable support adapted to hold a die, of means mounted on the support adapted to engage the die and move the latter therewith, a rock shaft, means for moving said shaft, a gear independently movable on said shaft, connections beneath the gear and the die-moving means of the support, frictionally engaging means adapted to move the gear in either direction, an arm having means to operate said frictionally engaging means, and means for moving said arm.

57. The combination with a reciprocatory support adapted to hold a die, of means mounted on the support adapted to engage the die and move the latter therewith, a shaft, means for moving said shaft, a gear independently movable on said shaft, connections between the gear and the die-moving means of the support, a clutch block engaging said gear and adapted to move the gear in either direction, and means for operating the said block.

58. The combination with die-supporting means, of means for moving a die back and forth with a step-by-step movement along the supporting means, together with means for varying the throw of the die.

59. The combination with a reciprocatory die-supporting means, of means for moving a die back and forth with a step-by-step movement along the supporting means, means for detachably holding the die to said supporting means, together with means for varying the throw of the die.

60. The combination with die-supporting means, of a shaft, means for rocking said shaft, a plurality of bell-crank levers held to said shaft, a ratchet member loosely mounted on the shaft, pawls movable with the bell-crank levers adapted to engage the ratchet member, a cam plate located adjacent to one of the bell-crank levers, arms movable with the pawls and adapted to be engaged by the cam plate to throw either of the pawls into or out of engagement, and means for tripping either of the pawls during the movement thereof to vary the throw of the die.

61. The combination with reciprocatory die-supporting means, of a shaft, means for moving said shaft, a plurality of bell-crank levers held to said shaft, a ratchet member loosely mounted on the shaft, pawls movable with the bell-crank levers adapted to engage the ratchet member, a cam located adjacent to one of the bell-crank levers and means to automatically operate the cam to throw either of the pawls into or out of engagement with the ratchet member.

62. The combination with die-supporting means, of a shaft, a plurality of bell-crank levers held to said shaft, a ratchet member loosely mounted on the shaft, pawls carried by the bell-crank levers adapted to engage the ratchet member, a cam plate located adjacent to one of the bell-crank levers, means automatically operating the cam to throw either of the pawls into or out of engagement with said ratchet member, and means for tripping either of the pawls during the movement thereof to vary the throw of the die.

63. The combination with movable die-supporting means, of a shaft, means for moving said shaft, arms carrying pawls movable with the shaft, a ratchet member having teeth adapted to be engaged by the pawls to move the member in either direction, means whereby the ratchet member may move the die in either direction, together with means whereby one of the pawls may be automatically placed in an operative position and the other pawl in an inoperative position.

64. The combination with movable die-supporting means, of a shaft, means for moving said shaft, arms carrying pawls movable with the shaft, a ratchet member having teeth adapted to be engaged by the pawls to move said member in either direction, means whereby the ratchet member may move the die in either direction, a cam, together with means for operating the cam whereby one of the pawls may be automatically placed in a working position and the other pawl in a blank position.

65. The combination with means for supporting a die, of means for reciprocating the die-supporting means, a shaft, means for rocking the shaft, a plurality of arms carried by said shaft, pawls carried by said arms, a ratchet member having teeth adapted to be engaged by the pawls one at a time, spring-held means for returning the ratchet member to its normal position, connections between the ratchet member and the die for operating the same, a plurality of arms carried by the shaft having means coöperating with the pawls to regulate the position of the same, a cam plate adapted to engage the means carried by the last-mentioned arms and adapted to throw either pawl out of working position, and means for automatically actuating the cam plate at the end of the throw of the die.

66. The combination with means for supporting a die, of means for moving the die-supporting means, a shaft, means for moving the shaft, a plurality of arms carried by said shaft, pawls carried by said arms, a ratchet member having teeth adapted to be engaged by the pawls one at a time, spring-held means for returning the ratchet member to its normal position, connections between the ratchet member and the die for operating the same, a plurality of arms carried by the shaft having means coöperating with the pawls to regulate the position of the same, a cam plate adapted to engage the means carried by the last-mentioned arms and adapted to throw either pawl out of working position, means for automatically actuating the cam plate, and means for varying the throw of the ratchet member.

67. The combination with means for supporting a die, of means for moving the die-supporting means, means mounted on the supporting means adapted to engage and move the die in either direction, a shaft, means for moving the shaft, a plurality of arms carried by said shaft, pawls carried by said arms, the ratchet member having teeth adapted to be engaged by the pawls one at a time, connections between the ratchet member and the die for operating the same, a plurality of arms carried by the shaft having means coöperating with the pawls to regulate the position of the same, a cam adapted to engage the means by the last-mentioned arms and adapted to throw either pawl out of working position, and means for automatically actuating the cam.

68. The combination with die-supporting means, of means for reciprocating said means, means mounted on the support for moving the die across the same, a shaft, means for moving the shaft, ratchet means, connections between the same for moving the die in either direction along its support, pinions carried by the ratchet means and connections movable about the shaft, segments engaging the pinions, a second set of segments, the said pinions and segments connected therewith being independently movable of each other, rack bars in engagement with the segments of each pinion, a plurality of cylinders one for each rack bar, sleeves independently movable of the rack bar and having a limited movement within said cylinders, and a spring interposed between the sleeves whereby the pinions and parts operated thereby may be returned to their normal position.

69. The combination with the die-supporting means, of means for reciprocating said supporting means, means mounted on the support for moving the die across the same, a shaft, means for moving the shaft, ratchet means, connections between the same for moving the die in either direction along its support, a pinion carried by the ratchet means and movable about the shaft, a segment engaging the pinion, a second segment, a rack bar in engagement with one of the segments, a cylinder, sleeves independently movable on the rack bar and movable within said cylinders, and a spring interposed between the sleeves whereby the pinion and parts operated thereby may be returned to their normal position.

70. The combination with die-supporting means, of means for reciprocating said supporting means, means mounted on the support for moving the die across the same, a shaft, means for moving the shaft, a ratchet member, connections between the same for moving the die in either direction along its support, said connections including a clutch block, pinions carried by the ratchet member and the clutch block and movable about the shaft, segments engaging the pinions, the said pinions and segments connected therewith being independently movable of each other, and yieldingly held means for forcing the clutch block and ratchet member to their normal position.

71. The combination with die-supporting means, of means for reciprocating said supporting means, means mounted on the support for moving the die across the same, a shaft, means for moving the shaft, a ratchet member, connections operated by the ratchet member for moving the die in either direction along its support, said connections including a clutch block, pinions carried by the ratchet member and clutch block, segments engaging the pinions, a bar operatively connected to each segment, and yieldingly held devices having a limited movement on each of said bars.

72. The combination with die-supporting means, of means for reciprocating said supporting means, means mounted on the support for moving the die across the same, independently movable pinions and mechanisms operatively connected therewith for moving the die in either direction along its support, segments engaging the pinions, a second set of segments, the said pinions and segments connected therewith being independently movable of each other, rack bars in engagement with the segments of each pinion, a plurality of cylinders one for each rack bar, sleeves independently movable of each of the rack bars and movable within said cylinders, and a spring interposed between the sleeves of each cylinder whereby the pinions and parts operated thereby may be returned to their normal position.

73. The combination with die-supporting means, of means for moving the die in cutting position to cut blanks, means for moving the die along its supporting means in either direction and including ratchet mechanism, two oppositely movable cam devices adapted to govern the extent of movement of the ratchet mechanism and through the same the distance of movement of the die, and means for manually operating said cam devices.

74. The combination with cutting means, of means for moving the cutting means, means for moving the cutting means in either direction and including ratchet mechanism, two oppositely movable cam plates adapted to govern the extent of movement of the ratchet mechanism and through the same the distance of movement of the cutting means, and means for manually operating the cam plates.

75. The combination with die-supporting means, of means for moving the die-supporting means, a die to cut the blanks, means for moving the die along its supporting means in either direction and including ratchet mechanism, and means adapted to govern the extent of movement of the ratchet mechanism and through the same the distance of movement of the die.

76. The combination with die-supporting means, of means for reciprocating said supporting means, a ratchet member, connections therewith whereby the die may be moved in either direction, pawls adapted to engage the ratchet member, two oppositely movable cam devices one for each pawl adapted to disengage the pawls from the ratchet member according to the position of said cam devices, a segment carried by each cam device, a pinion in engagement with both of said segments, a worm gear movable with the pinion, a worm in engagement with the worm gear, a rod for rotating the worm, and a pointer movable by the rotation of the rod adapted to indicate the extent of movement of the cam devices whereby the length of the feed of the die may be readily ascertained.

77. The combination with die-supporting means, of means for reciprocating said supporting means, a ratchet member, connections therewith whereby a die may be moved in either direction along the supporting means, pawls adapted to engage the ratchet member, two oppositely movable cam devices one for each pawl adapted to disengage the pawls from the ratchet member according to the position of said cam devices, means for operating the cam devices, an indicator, and a pointer movable with the means for operating the cam devices whereby the length of the feed of the die may be readily ascertained.

78. The combination with die-supporting means, of means for reciprocating the supporting means, a ratchet member and connections therewith whereby a die may be moved in either direction along the supporting means, pawls adapted to engage the ratchet member, two oppositely movable cam devices one for each pawl adapted to disengage the pawls from the cam member according to the position of said cam devices, a segment carried by each cam device, a pinion in engagement with said segments, and means for manually operating the pinion.

79. The combination with a die-support, of means for feeding a die along its support including a ratchet mechanism, means for reversing the direction of movement of the ratchet mechanism and the feed of the die, said means including a cam plate having two parts thereof adapted to disengage independent pawls of the ratchet mechanism, a pinion movable with the cam plate, a segment in engagement with the pinion, a shaft carrying the segment, and means for automatically actuating the shaft to shift the position of the cam plate and thereby reverse the direction of the movement of the ratchet mechanism.

80. The combination with cutting means, of means for moving said cutting means and including a ratchet mechanism, together with means for reversing the direction of movement of the ratchet mechanism, said means including a cam plate having two parts thereof adapted to disengage independent pawls of the ratchet mechanism, and means for operating the cam plate.

81. The combination with a die-support, of means for feeding the die along its support including a ratchet mechanism, together with means for reversing the direction of movement of the ratchet mechanism and the feed of the die, said means including a cam plate having two parts thereof adapted to disengage independent pawls of the ratchet mechanism, a pinion movable with the cam plate, a segment in engagement with the pinion, and means for automatically actuating the shaft to shift the position of the cam plate and thereby reverse the direction of the movement of the die.

82. The combination with die-supporting means, of means for supporting fabric under the die, means for reciprocating the die to cut blanks from the fabric, means for moving the die along its support with a step-by-step movement in either direction, together with reversing mechanism including a gear movable with the die feed, an engaging plate carried by the gear, an arm independently movable of the gear having a part adapted to be engaged by the plate carried by said gear, a bell-crank lever, connections between the bell-crank lever and said arm whereby the bell-crank lever may be moved in one direction, and means for moving the bell-crank lever in the opposite direction.

83. The combination with die-supporting means, of means for supporting fabric under the die, means for reciprocating the die to cut blanks from the fabric, means for moving the die along its support with a step-by-step movement in either direction, together with reversing mechanism including a gear movable with the die feed, an engaging plate carried by the gear, an arm independently movable of the gear having a part adapted to be engaged by the plate carried by said gear, a bell-crank lever, ratchet mechanism, means operated by the bell-crank lever to reverse the direction of movement of the ratchet mechanism, connections between the bell-crank lever and said arm whereby the bell-crank lever may be moved in one direction, and means for moving the bell-crank lever in the opposite direction.

84. The combination with die-supporting means, of means for supporting fabric under the die, means for reciprocating the die to cut blanks from the fabric, means for moving the die along its support with a step-by-step movement in either direction, a gear movable with the die feed, engaging means carried by the gear, an arm independently movable of the gear adapted to be engaged by the plate carried by said gear, means for varying the distance the gear should move before operating the arm, and means for moving the cam in the opposite direction.

85. The combination with die-supporting means, of means for supporting fabric under the die, means for reciprocating the die to cut blanks from the fabric, means for moving the die along its support with a step-by-step movement in either direction, a gear movable with the die feed, an arm independently movable of the gear adapted to be engaged and moved by said gear, a bell-crank lever, ratchet mechanism, means connected to said lever to reverse the direction of movement of said ratchet mechanism, a connection between the bell-crank lever and said arm whereby the bell-crank lever may be moved by the gear in one direction, and means for moving the bell-crank lever in the opposite direction.

86. The combination with die-supporting means, of means for reciprocating said die-supporting means, a shaft, connections between said shaft and the die whereby the die may be fed in either direction, a clutch mechanism on said shaft including a toothed member, a pawl adapted to engage the toothed member to hold the shaft stationary, and means controlled by the die support, reciprocating means for actuating the pawl to permit the die feed to be operated through the clutch mechanism.

87. The combination with a die-support, of means for moving said die-support, a shaft, connections between said shaft and the die whereby the die may be fed along its support, a clutch mechanism on said shaft including a toothed member, a pawl adapted to engage the toothed member to hold the shaft stationary, and means controlled by the die support, moving means for actuating the pawl to permit the die feed to be operated through the clutch mechanism.

88. The combination with a die-support, of means for reciprocating said die-support, a shaft, connections between said shaft and the die whereby the die may be laterally moved along the support, a clutch mechanism on said shaft including a toothed member, a pawl adapted to engage the toothed member to hold the shaft stationary and means for actuating the pawl to permit the die feed to be operated through the clutch mechanism.

89. The combination with a die-support, of means for moving said support, a shaft and connections between said shaft and die-support whereby the die may be operated in either direction when the shaft is rotated, clutch mechanism, a pawl for holding the clutch mechanism in an operative position, a shaft extending transversely of the die-feed shaft, a collar engaging a part of the pawl and held to the second shaft, means for moving the shaft and operated from the means for moving the die support, together with means operated through the shaft for reversing the direction of movement of the die feed.

90. The combination with a die-support, of means for moving said support, a shaft and connections between said shaft and die-support whereby a die may be operated in either direction along said support when the shaft is rotated, clutch mechanism, a pawl for holding the clutch mechanism in an inoperative position, a shaft extending transversely of the die feed shaft, a collar engaging a part of the pawl and held to the second shaft, means for moving the shaft, together with means operated through the shaft for reversing the direction of movement of the die feed.

91. The combination with a die-support, of means for moving said support, a shaft, connections between said shaft and die-support for moving a die along said support when the shaft is rotated, clutch mechanism, a pawl for holding the clutch mechanism in an inoperative position, a shaft extending transversely of the die feed shaft, a collar engaging a part of the pawl and held to the second shaft, and means for moving the shaft.

92. The combination with a die-support, of a die feed shaft, mechanism connected with said shaft to operate the die in either direction along its support, a second shaft, connections between said second shaft and the die feed shaft whereby the latter may be held stationary or rotated to feed the die, die feed reversing mechanism, and means connected with the second shaft whereby the reversing mechanism may be operated to change the direction of the die feed.

93. The combination with a die-support, of a die feed shaft, mechanism connected with said shaft to operate the die along its support, a second shaft, connections between said shaft and the die feed shaft whereby the latter may be held stationary or rotated to feed the die, and means whereby the direction of die feed may be changed.

94. The combination with die-supporting means, of means for supporting fabric in layers under the die, means for moving the die to cut the blanks from the fabric, die feed mechanism for moving the die in either direction, a shaft, a lever for reciprocating the shaft and operatively connected with the die-moving means, means located on the shaft for controlling the movement of the die feed and having a toothed member, a second toothed member held to the shaft adapted to be engaged by the other member, and reversing mechanism connected to said shaft whereby the die feed mechanism may be reversed to move the die back and forth along its support.

95. The combination with die-supporting means, of means for supporting fabric in layers under the die, means for moving the die to cut the blanks from the fabric, die feed mechanism for moving the die in either direction, a shaft, and a lever for reciprocating the shaft and operatively connected with the die-moving means.

96. The combination with die-supporting means, of means for supporting fabric in layers under the die, means for moving the die to cut the blanks from the fabric, die feed mechanism for moving the die in either direction, reversing mechanism, a lever, and means operatively connected to the lever for actuating the reversing mechanism.

97. The combination with a die-support, of means for reciprocating the die including a shaft, fabric feeding mechanism, die-feeding mechanism, a second shaft, a lever for reciprocating the shaft and operatively connected to the shaft for reciprocating the die, two sleeves in which the shaft is slidingly held, one of which is provided with projections at one end, a collar having projections with spaces between the same adapted to engage the projections of one of the sleeves, a collar fixed to the shaft and having projections adapted to engage the projections of the first-mentioned collar to operate the fabric feed, a second collar fixed to the shaft also having projections, a collar operatively connected with the die-feed mechanism and adapted to engage the teeth of the collar of the die-feed, arms movable with the shaft, connections with one of the arms so as to be operated by the fabric feed to move the shaft in one direction, a second arm, and means therewith for reversing the direction of movement of the die feed mechanism.

98. The combination with a die-support, of means for moving said support, fabric-feeding mechanism, die-feed mechanism, a shaft, means for rocking said shaft, die-reversing mechanism, and means for connecting said shaft to said reversing mechanism to actuate the latter.

99. The combination with a die-support, of means for moving said support, fabric-feeding mechanism, die-feed mechanism, a shaft, a lever for reciprocating the shaft and operatively connected to the means for moving the die-support, reversing mechanism, and means operated by the shaft to control the die-feed, the fabric-feed and the reversing mechanism.

100. The combination with a die-support, of means for reciprocating the support, fabric-feeding mechanism, die-feed mechanism, a shaft, a lever for reciprocating the shaft and operatively connected to the means for reciprocating the die, two sleeves in which the shaft is slidingly held one of which is provided with projections at one end, a device having projections adapted to engage the projections of one of the sleeves, and a collar fixed to the shaft and having projections adapted to engage the projections of the device to operate the fabric feed.

101. The combination with die-supporting means, of means for reciprocating said supporting means, fabric-feeding mechanism, die-feed mechanism, a shaft, a lever for reciprocating the shaft and operatively connected to the means for reciprocating the supporting means, two sleeves one of which is provided with projections at one end, a device having projections adapted to engage the projections of one of the sleeves, a collar fixed to the shaft and having projections adapted to engage the projections of said device to operate the fabric feed, a second collar fixed to the shaft having projections, a second device operatively connected with the die-feed mechanism and adapted to engage the projections of the collar and means for moving the shaft in opposite directions to operate either the fabric feed or the die feed.

102. The combination with die-supporting means, of means for reciprocating said supporting means, means for moving the die along its supporting means, an endless apron on which the fabric in layers is adapted to be supported, means for moving the apron and timed with relation to the movement of the die-feed mechanism, and an independent carrier located in advance of the fabric carrying apron for positioning the fabric adjacent to the die.

103. The combination with a die-support, of means for moving the support, means for moving a die laterally along the supporting means, a carrier apron on which the fabric in layers is adapted to be supported, and means for automatically moving the carrier and timed with relation to the movement of the die-feed mechanism.

104. The combination with a die-support, of means for moving said supporting means, means for moving a die along the supporting means, a movable carrying device on which the fabric is adapted to be supported, means for automatically moving said device and timed with relation to the movement of the die-feed mechanism, and an independent device located in advance of the fabric carrying device for positioning the fabric under the die support.

105. The combination with die-supporting means, of means for moving said supporting means, means whereby a die may be fed along its supporting means in either direction, means for supporting fabric in layers under the die-supporting means, an endless carrier movable under the die and comprising two chain members, a track arranged in the path of movement of said chain members, devices pivotally held to said chain members and having trunnions adapted to travel along said track and to be elevated thereby so as to be disposed angularly with respect to said chain members as the same travel along the track and to engage the fabric and to pull the same forward as the chain members are advanced, and means for intermittently moving said chain members.

106. The combination with die-supporting means, of means for moving said supporting means, means whereby the die may be fed along its supporting means, means for supporting fabric under said die-supporting means, a carrier movable under the last-mentioned means, a track arranged in the path of movement of said chain members, and pivotally held devices having a part thereof adapted to travel along said track and to be elevated thereby so as to be disposed angularly with respect to said carrier as the same travels along the track and to engage the fabric and to pull the same forward as the carrier is advanced.

107. The combination with a die and supporting means therefor, of means for reciprocating said die, means whereby the die may be fed along its supporting means, means for supporting fabric under the die, a movable fabric carrying device, an endless carrier movable under the die and comprising two chain members, a track arranged in the path of movement of said chain members, and devices pivotally held to said chain members and having trunnions adapted to travel along said track and to be elevated thereby so as to be disposed angularly with respect to said chain members as the same travel along the track and to engage the fabric and to pull the same forward as the chain members are advanced.

108. The combination with a die and supporting means therefor, means for reciprocating the die, means for moving the die in either direction along the supporting means, means for supporting superposed layers of fabric in the path of movement of the die, an endless carrier having devices adapted to engage and move the fabric at the forward part thereof to position the same properly under the die, a second endless carrier, together with means timed with relation to the movement of the die-reciprocating means, and the die-feeding means for operating the two endless carriers one in advance of the other.

109. The combination with a die and supporting means therefor, of means for reciprocating the die, means for moving the die along the supporting means, means for supporting superposed layers of fabric in the path of movement of the die-supporting means, a carrier, pivotally held devices adapted to engage and move the fabric at the forward part thereof to position the same properly under the die-supporting means, a second carrier, together with means timed with relation to the movement of the die-supporting means and the die-feeding means for operating the two carriers.

110. The combination with movable die-supporting means, of die-feeding mechanism, means for supporting the fabric in layers, a shaft forming a part of the supporting means, an arm loosely held to said shaft, means for intermittently moving said arm, a pawl carried by said arm, a toothed member adapted to be engaged by the pawl and independently movable of the shaft, ratchet means movable by the toothed member and adapted to impart a step-by-step movement to the shaft and thereby to the fabric-supporting means, a pinion carried by the toothed member, a segment engaged by the pinion, an arm movable with the segment, a spring-held plunger, a pivotally held casing into which the plunger is adapted to move, said spring tending to normally force the toothed member in one direction against the action of the pawl, together with means for varying the throw of the pawl according to the length of feed of the fabric desired.

111. The combination with movable die-supporting means, of die-feeding mechanism, means for supporting the fabric in layers, a shaft forming a part of the supporting means, an arm loosely held to said shaft, means for intermittently moving said arm, a pawl carried by said arm, a spring normally forcing the pawl in one direction, a toothed member adapted to be engaged by the pawl and independently movable on the shaft, and ratchet means movable by the toothed member and adapted to impart a step-by-step movement to the shaft and thereby to the fabric-supporting means, and a pinion carried by the toothed member.

112. The combination with die-supporting means, of die-feeding mechanism, means for supporting the fabric, a shaft forming a part of the supporting means, an arm loosely held to said shaft, means for intermittently moving said arm, a pawl carried by said arm, a toothed member adapted to be engaged by the pawl and independently movable on the shaft, ratchet means movable by the toothed member and adapted to impart a step-by-step movement to the shaft and thereby to the cloth-supporting means, a pinion carried by the toothed member, a segment engaged by the pinion, an arm movable with the segment, a spring-held plunger, and a pivotally held casing in which the plunger is adapted to move.

113. The combination with die-supporting means, of means for moving said die-supporting means, means for feeding the die in either direction, movable fabric-supporting means, a shaft, an arm movable on said shaft, means operatively connecting said arm to the die-feeding means, a cam movable adjacent to the arm, a pawl carried by said arm, a toothed member adapted to be engaged by the pawl, means actuated by the toothed member to rotate said shaft, a second arm movable with the pawl and adapted to travel along the cam, and means whereby the position of the cam may be changed and the length of feed of the fabric varied.

114. The combination with die-supporting means, of means for moving said die-supporting means, movable fabric-supporting means, a shaft, ratchet mechanism for imparting a step-by-step movement to the shaft, a cam independently movable of the shaft and adapted to engage a part of the ratchet mechanism to vary the throw thereof, and means for moving the cam.

115. The combination with die-supporting means, of means for moving said die-supporting means, movable fabric-supporting means, a shaft, ratchet mechanism for imparting a step-by-step movement to said shaft, a cam independently movable of the shaft and adapted to engage a part of the ratchet mechanism to vary the throw thereof, a sector, and a lever fixed to the cam and having means adapted to engage the sector whereby the position of the cam may be changed and the length of the feed of the fabric varied.

116. The combination with die-supporting means, of means for reciprocating the die-supporting means including a clutch-driven shaft, die-feeding means including a clutch-driven shaft, and means operatively connecting the shafts in such a way that the movement of one will be controlled by the other.

117. The combination with die-supporting means, of means for moving the die-supporting means including a clutch-driven shaft, die-feeding means including a clutch-driven shaft, cloth-feeding means including a clutch-driven shaft, and means operatively connecting the three shafts in such a way that the movement of one will be controlled by the other.

118. The combination with die-supporting means, of means for moving the supporting means, die-feeding mechanism including a shaft, cloth-feeding mechanism including a shaft, cams arranged on the ends of said shafts, levers operated by said cams, segmental connections between the levers, an arm, a rod connecting said arm to one of the levers, means for controlling the movement of die-supporting means, an arm normally movable with the arm connected to the die-supporting operating means, a starting and stopping lever, and connections between the lever and one of the arms whereby the three may be locked together so that the movement of the die in cutting, the die feed, and cloth feed mechanism may be positively controlled and timed with relation to each other.

119. The combination with die-supporting means, of means for moving the supporting means, die-feeding mechanism including a shaft, cloth-feeding mechanism including a shaft, cams arranged on the ends of said shafts, levers operated by said cams, means connecting the levers to operate in unison, an arm, a rod connecting said arm to one of the levers, means for controlling the movement of the die-supporting means, an arm normally movable with the arm connected to the die-supporting operating means, a lever, and connections between the lever and one of the arms whereby the three may be locked together.

120. The combination with die-supporting means, of means for moving the supporting means, die-feeding mechanism including a shaft, cloth-feeding mechanism including a shaft, levers operated by said shaft, an arm, a rod connecting said arm to one of the levers, means for controlling the movement of the die-supporting means, a lever, and connections whereby the die in cutting, the die feed, and the cloth feed mechanism may be positively controlled and timed with relation to each other.

121. The combination with die-supporting means, of means for reciprocating said supporting means, fabric feed mechanism, mechanism for feeding the die transversely of its support in either direction, reversing mechanism, a pivotally held arm, connections between said arm and both the fabric-feed mechanism and the die-feed mechanism, a second arm connected with the means for moving the die-supporting means, a lever having a cam groove on one surface thereof, a locking block having a projection adapted to engage the arm connected to the die-feed and fabric-feed mechanism to lock said arm to move with the arm connected to the means for operating the die-supporting means or to move independent thereof when released, an operating lever, and a rod connecting the operating lever to the lever carrying the locking block.

122. The combination with die-supporting means, of means for moving said supporting means, fabric-feed mechanism, mechanism for feeding the die transversely of its support, a pivotally held arm, connections between said arm and both the fabric-feed mechanism and the die-feed mechanism, a second arm connected with the means for moving the die-supporting means, a lever having a cam groove on one surface thereof, and a locking block adapted to engage the arm and hold said arm and lever together.

123. The combination with a die-support, of means for moving the support, means for moving a die laterally along the supporting means, a carrier apron on which the fabric in layers is adapted to be supported, and means for automatically and periodically moving the carrier and timed with relation to the movement of the die-feed mechanism.

124. The combination with a support, of a die, means for moving the support and die to cut blanks, and means for automatically changing the direction of movement of the die after the die has cut a series of blanks.

125. The combination of a movable support, of a die, means for holding the die fixed to the support while cutting, and means for automatically changing the direction of movement of the die after a series of cutting operations.

126. The combination with a movable support, of a die, means for holding the die fixed to the support while cutting, and means for automatically imparting a step-by-step movement to the die along the support in either direction.

127. The combination with die-supporting means, of means for reciprocating said supporting means, a shaft, means for moving the shaft, clutch mechanism, ratchet mechanism, and yieldingly held devices adapted to independently restore the clutch and ratchet mechanisms to their normal position.

128. The combination with die-supporting means, of means for reciprocating said supporting means, a shaft, means for moving the shaft, clutch mechanism, ratchet mechanism, means for operating said mechanisms in one direction to feed the die, and means adapted to independently restore the clutch and ratchet mechanism to their normal position.

129. The combination with die-supporting means, of a die, means mounted on the supporting means for moving the die across the same, a shaft, ratchet mechanism, clutch mechanism, pinions carried by a part of the ratchet mechanism and the clutch mechanism, segments engaging the pinions, a bar operatively connected to each segment, cylinders in which the bars are adapted to move, and yieldingly held sleeves having a limited movement on each of said bars in each of said cylinders.

130. The combination with die-supporting means, of a die, means mounted on the supporting means for moving the die across the same, a shaft, ratchet mechanism, clutch mechanism, pinions carried by a part of the ratchet mechanism and the clutch mechanism, segments engaging the pinions, a bar operatively connected to each segment, cylinders in which the bars are adapted to move, sleeves having a limited movement on each of said bars in each of said cylinders, and springs interposed between the sleeves.

131. The combination with a die support, of a die, mechanism for moving the die along the support, and manually operated means for moving the die independent of the die-moving mechanism.

132. The combination with a die support, of a die, mechanism for moving the die along the support, and a hand wheel for moving the die along the support to manually position the same independent of the operation of said mechanism.

133. The combination with a die support, of a die, fabric-feeding mechanism for positioning the fabric, and manually operated means for operating the fabric feeding mechanism, independently of the mechanism itself.

134. The combination with a die support, of a die, fabric-feeding mechanism for positioning the fabric under the die, and a wheel coöperating with said mechanism to permit the fabric to be positioned by hand.

135. The combination of a die support, of means for moving the die along its support, fabric feeding means, means for feeding the fabric to position the same under the die, and manual means for operating the die for positioning the fabric independently of the movement of its operating mechanism.

136. The combination with a die support, of means for moving said support, fabric feeding mechanism, die feeding mechanism, a shaft, a lever for reciprocating said shaft, die reversing mechanism, means for rocking said shaft, means for connecting said shaft to said reversing mechanism to actuate the latter, and devices coöperating with the shaft in its movement to determine the direction of movement of said reversing mechanism.

137. The combination with a die support, of means for moving said support, fabric feeding mechanism, die feeding mechanism, a shaft, a lever for reciprocating said shaft, die reversing mechanism, means for rocking said shaft with two distinct movements in each direction, means for connecting said shaft to said reversing mechanism to actuate the latter, and toothed devices coöperating with the shaft in its movement to determine the direction of movement of said reversing mechanism.

138. The combination with a die support, of means for moving said support, fabric feed mechanism, die feeding mechanism, a shaft, a lever for reciprocating the shaft and operatively connected to means for moving the die support, reversing mechanism, means for rocking the shaft with two distinct movements in one direction and for imparting a like movement to said shaft in the opposite direction according to the direction of feed of the die, and toothed devices coöperating with the shaft having spaces between said teeth whereby on the movement of said shaft certain of the teeth of said devices will engage each other while the teeth of certain other devices will enter the spaces between the teeth of devices located adjacent thereto.

139. The combination with a die support, of means for moving said support, fabric feed mechanism, die feed mechanism, a shaft, means for reciprocating the shaft, reversing mechanism, and toothed devices coöperating with the shaft having spaces between said teeth whereby on the movement of said shaft, certain of the teeth of said devices will engage each other while the teeth of certain other devices will enter the spaces between the teeth of devices located adjacent thereto.

140. The combination with a die support, of a die, means for feeding the die along the support, fabric feed mechanism, mechanism for reciprocating the die, mechanism for controlling the operation of the die feed, fabric feed, and the die reciprocating means one by the other, a starting and stopping lever, and connections with said lever and the controlling mechanism whereby the machine may be stopped or started at will.

141. The combination with a die support, of a die, means for feeding the die along the support, mechanism for reciprocating the die, mechanism for controlling the operation of the die feed, and the die reciprocating means one by the other, a starting and stopping lever, and connections with said lever and the controlling mechanism whereby the machine may be stopped or started at will.

This specification signed and witnessed this twenty-fifth day of February A. D. 1909.

BENJAMIN W. TUCKER.

Witnesses:
FREDERICK B. BLACKMAN,
CECELIA A. HURLEY.